US007922936B2

(12) United States Patent
Hampden-Smith et al.

(10) Patent No.: US 7,922,936 B2
(45) Date of Patent: Apr. 12, 2011

(54) LUMINESCENT COMPOSITIONS, METHODS FOR MAKING LUMINESCENT COMPOSITIONS AND INKS INCORPORATING THE SAME

(75) Inventors: Mark J. Hampden-Smith, Albuquerque, NM (US); Liam Noailles, Albuquerque, NM (US); Richard Anthony Einhorn, Albuquerque, NM (US); Darryl S. Williams, Groton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 12/633,185

(22) Filed: Dec. 8, 2009

(65) Prior Publication Data

US 2010/0084852 A1 Apr. 8, 2010

Related U.S. Application Data

(63) Continuation of application No. 11/588,030, filed on Oct. 26, 2006.

(51) Int. Cl.
*B42D 15/10* (2006.01)
*C09K 11/08* (2006.01)
*C09K 11/02* (2006.01)

(52) U.S. Cl. ...... 252/301.36; 252/301.4 P; 252/301.4 R; 252/301.4 F; 106/31.64; 106/31.15; 106/31.32; 428/690; 283/92

(58) Field of Classification Search ............ 252/301.36, 252/301.4 P, 301.4 R, 301.4 F; 106/31.64, 106/31.15, 31.32; 428/690; 283/92
See application file for complete search history.

(56) References Cited

U.S. PATENT DOCUMENTS

| 3,473,027 | A | | 10/1969 | Freeman et al. |
| 4,019,188 | A | | 4/1977 | Hochberg et al. |
| 4,202,491 | A | * | 5/1980 | Suzuki ........................... 235/491 |
| 4,539,041 | A | | 9/1985 | Figlarz et al. |
| 4,627,875 | A | | 12/1986 | Kobayashi et al. |
| 4,877,451 | A | | 10/1989 | Winnik et al. |
| 5,329,293 | A | | 7/1994 | Liker |
| 5,478,381 | A | * | 12/1995 | Ohiwa et al. .................. 524/148 |
| 5,611,958 | A | * | 3/1997 | Takeuchi et al. ........ 252/301.4 P |
| 5,679,724 | A | | 10/1997 | Sacripante et al. |
| 5,725,647 | A | | 3/1998 | Carlson et al. |
| 5,725,672 | A | | 3/1998 | Schmitt et al. |
| 5,837,041 | A | | 11/1998 | Bean et al. |
| 5,837,045 | A | | 11/1998 | Johnson et al. |
| 5,853,470 | A | | 12/1998 | Martin et al. |
| 5,932,139 | A | * | 8/1999 | Oshima et al. ........... 252/301.16 |
| 6,180,029 | B1 | | 1/2001 | Hampden-Smith et al. |
| 6,251,488 | B1 | | 6/2001 | Miller et al. |
| 6,338,809 | B1 | | 1/2002 | Hampden-Smith et al. |
| 6,601,776 | B1 | | 8/2003 | Oljaca et al. |
| 6,802,992 | B1 | | 10/2004 | Wieczoreck et al. |

FOREIGN PATENT DOCUMENTS

| GB | 2413334 A | 6/2004 |
| GB | 2258659 A | 10/2009 |

OTHER PUBLICATIONS

International Search Report of the International Search Authority mailed Jun. 14, 2007.
P.-Y. Silvert et al., "Preparation of colloidal silver dispersions by the polyol process" Part 1—Synthesis and characterization, J. Mater. Chem., 1996, 6(4), 573-577.
P.-Y. Silvert et al., "Preparation of colloidal silver dispersions by the polyol process" Part 2—Mechanism of Particle formation, J. Mater. Chem., 1997, 7(2), 293-299.

* cited by examiner

*Primary Examiner* — C. Melissa Koslow

(57) ABSTRACT

A particulate luminescent composition is disclosed that, when excited by electromagnetic radiation at a first frequency, emits electromagnetic radiation at a second frequency equal to or within 1500 cm$^{-1}$ of the first frequency. The luminescent composition comprises substantially spherical particles having a weight average particle size of less than about 10 μm and a particle size distribution such that at least about 90 weight percent of the particles are not larger than twice the average particle size.

30 Claims, No Drawings

LUMINESCENT COMPOSITIONS, METHODS FOR MAKING LUMINESCENT COMPOSITIONS AND INKS INCORPORATING THE SAME

FIELD

This invention relates to luminescent compositions, methods for making luminescent compositions and inks incorporating the same.

BACKGROUND

Phosphors are compounds that are capable of emitting useful quantities of radiation in the visible, infrared and/or ultraviolet spectrums upon excitation of the phosphor compound by an external energy source. Due to this property, phosphor compounds have long been utilized in cathode ray tube (CRT) screens for televisions and similar devices, as taggants for authenticating documents and products and for luminescent coatings in fluorescent lamps, x-ray scintillators, light emitting diodes, and fluorescent paints. Typically, inorganic phosphor compounds include a host material doped with a small amount of an activator ion.

Many commercially available phosphors obey Stokes Law, in that their emissions are at a lower energy than that of the exciting radiation. For example, such materials when irradiated with ultraviolet radiation will emit in the visible spectrum. For example, U.S. Pat. No. 3,473,027 discloses a process for recording and retrieving information which comprises forming symbols from inks having one or more photoluminescent components which luminesce under ultraviolet or other short wave radiation. At least one of the photoluminescent components is a complex of a lanthanide ion which has an atomic number greater than 57 and which, according to claim 10, can have the formula $Y_{1-x}M_xVO_4$ where M is selected from the group consisting of Nd, Sm, Eu, Dy, Ho, Er, Tm, and Yb and x has a value between 0.001 and 0.1.

Anti-Stokes or, as they are otherwise known, "up-converting meterials", emit light (visible or ultraviolet) which has a shorter wavelength than the activating radiation. For example, Anti-Stokes materials may absorb infrared radiation, typically at a wavelength of 700 to 1300 nm, and emit radiation in the visible spectrum.

For example, GB Patent Application No. 2,258,659 describes an Anti-Stokes luminescent material that comprises doped yttrium oxysulfide, in which the dopants comprise, by weight of the oxysulfide, 4 to 50% of Er and/or Yb and 1 to 50 ppm of one or more other lanthanide elements. The material absorbs IR radiation and emits in the visible region, typically such that there is a shift of at least 100 nm, and preferably of 200 nm or more between the illuminating and emitted radiation.

In addition, U.S. Pat. No. 6,802,992 describes non-green Anti-Stokes luminescent materials, comprising the elements Ln, erbium (Er) and ytterbium (Yb), where Ln represents at least one element which is selected from the group consisting of yttrium (Y), gadolinium (Gd), scandium (Sc) and lanthanum (La), said elements being present according to the formula $Ln_xYb_yEr_zO_aS_b$, wherein the sum of (x+y+z) is 2, the sum of (a+b)≦3, b<1 and x, y and z are stoichiometric factors defined as 1.5<x<1.9, 0.08<y<0.3, and 0.08<z<0.3. When excited by IR radiation in the wavelength range of approximately 900 to 1100 nm, these materials emit radiation in the visible range of approximately 650 to approximately 680 nm.

This invention relates to a class of luminescent compositions that are excited by and emit radiation in substantially essentially the same region of the electromagetic spectrum. The present luminescent compositions can be tailored to have a wide variety of absorption frequencies, emission frequencies, emission intensities and emission persistence after irradiation through control of the characteristics of the luminescent composition, comprising the host lattice, the dopant(s) used, the conditions used to prepare the luminescent composition, incorporation of non-host, non-luminescent atoms into the luminescent composition, and the like. These characteristics can be tailored for specific applications.

SUMMARY

In one aspect, the present invention resides in a powder batch comprising a luminescent composition that, when excited by electromagnetic radiation at a first frequency, emits electromagnetic radiation at a second frequency equal to or within 1500 cm$^{-1}$ of the first frequency.

Conveniently, said luminescent composition, when excited by electromagnetic radiation at said first frequency, emits electromagnetic radiation at a second frequency equal to or within 1000 cm$^{-1}$, preferably within 500 cm$^{-1}$, of the first frequency.

In one embodiment, said first frequency is typically in the range of about 5000 to about 9000 cm$^{-1}$, preferably about 5500 to about 7500 cm$^{-1}$.

In another embodiment, said first frequency is typically in the range of about 9000 to about 15000 cm$^{-1}$, preferably about 9500 to about 11500 cm$^{-1}$ or about 11500 to about 13000 cm$^{-1}$.

In yet another embodiment, said first frequency is typically in the range of about 15000 to about 25000 cm$^{-1}$, preferably about 15000 to about 17500 cm$^{-1}$ or about 17000 to about 20000 cm$^{-1}$.

In a further embodiment, said first frequency is typically in the range of about 25000 to about 50000 cm$^{-1}$.

Conveniently, said luminescent composition comprises at least one host lattice and at least one lanthanide element dopant ion, wherein the oxidation state of said lanthanide element dopant is preferably such that the ion has no unpaired d electrons.

Conveniently, said host lattice is selected from compounds comprising a cation containing at least one element selected from Groups 2, 3, 12, 13, 14 and 15 of the Periodic Table and the lanthanide elements, and an anion containing at least one element selected from Groups 15, 16 and 17 of the Periodic Table. Typically, the, or each, cation element is selected from yttrium, lanthanum, gadolinium, lutetium, zinc, magnesium, calcium, strontium, barium, boron, aluminum, gallium, silicon, germanium and phosphorus and the, or each, anion element is selected from nitrogen, arsenic, oxygen, sulfur, selenium, fluorine, chlorine, bromine, and iodine.

In another aspect, the present invention resides in a powder batch comprising substantially spherical particles of a luminescent composition having a weight average particle size of less than about 10 μm and a particle size distribution such that at least about 90 weight percent of said particles are not larger than twice said average particle size, wherein said luminescent composition, when excited by electromagnetic radiation at a first frequency emits electromagnetic radiation at a second frequency equal to or within 1500 cm$^{-1}$ of the first frequency.

In a further aspect, the invention resides in a method for the production of a particulate luminescent composition that comprises at least one lanthanide dopant and that, when excited by electromagnetic radiation at a first frequency emits electromagnetic radiation at a second frequency equal to or within 1500 cm$^{-1}$ of the first frequency, the method comprising:

(a) forming a liquid comprising precursors to the luminescent composition;
(b) generating an aerosol of droplets from the liquid; and
(c) heating the droplets to remove liquid therefrom and form a powder batch of the luminescent composition.

Preferably, the powder batch of said luminescent composition has an average particle size of less than about 10 microns, such less than about 5 microns, for example less than about 3 microns.

In yet a further aspect, the invention resides in a secure document, comprising: a document; and a security taggant comprising a powder batch comprising a luminescent composition that, when excited by electromagnetic radiation at a first frequency, emits electromagnetic radiation at a second frequency equal to or within 1500 cm$^{-1}$ of the first frequency.

In yet a further aspect, the invention resides in a luminescent ink, comprising: a liquid vehicle phase; and a functional phase dispersed throughout the liquid phase, the functional phase comprising a powder batch comprising a luminescent composition that, when excited by electromagnetic radiation at a first frequency, emits electromagnetic radiation at a second frequency equal to or within 1500 cm$^{-1}$ of the first frequency.

The luminescent composition can comprise particles of at least one host lattice and at least one lanthanide element dopant ion, wherein said at least one host lattice is selected from an yttrium compound, a lutetium compound and a lanthanum compound and said at least one lanthanide element dopant ion is selected from a ytterbium cation, an erbium cation and a thulium cation, having a weight average particle size between about 2 μm and less than about 10 μm.

The luminescent composition, when excited by electromagnetic radiation at said first frequency, can emit electromagnetic radiation at a second frequency equal to or within 1000 cm$^{-1}$ of the first frequency, or equal to or within 500 cm$^{-1}$ of the first frequency.

Particles of said luminescent composition can be substantially spherical.

The luminescent composition can comprise particles having a weight average particle size of between about 2 μm and less than about 5 μm, or between about 2 μm and less than about 3 μm.

The luminescent composition can comprise particles having a particle size distribution such that at least about 90 weight percent of said particles are not larger than twice an average particle size.

At least one host lattice can be selected from yttria, yttrium borate, yttrium phosphate, yttrium aluminate, yttrium silicate, and a mixed oxide of yttrium, gadolinium and aluminum.

At least one host lattice can be selected from lanthanum oxide, lanthanum phosphate, lanthanum aluminate, lanthanum borate and lanthanum silicate.

At least one host lattice can be selected from lutetium oxide and lutetium aluminate.

The particles can further comprise a microstructure containing crystallites of said luminescent composition of a size between about 25 nm and less than 150 nm, with less than 30 wt % of the mass of said crystallites being of a size between 150 nm and 600 nm.

The crystallites can be of a size between about 40 nm and less than 150 nm, or between about 60 nm and less than 150 nm, or between about 80 nm and less than 150 nm, or between about 100 nm and less than 150 nm.

DETAILED DESCRIPTION

The present invention is generally directed to luminescent or phosphor compositions and more specifically to particulate doped inorganic phosphor compositions that are both excited by radiation, and luminesce, in essentially the same region of the electromagnetic spectrum, including the ultra-violet, the visible, and the infra-red regions of the spectrum. The invention also relates to methods for producing such luminescent compositions, as well as inks, layered structures and devices which incorporate the compositions.

Luminescent Composition

The present luminescent composition comprises a powder batch of substantially spherical particles having a weight average particle size of less than about 10 μm, and a particle size distribution such that at least about 90 weight percent of the particles are not larger than twice the average particle size. When excited by electromagnetic radiation at a first frequency, the present luminescent composition emits electromagnetic radiation at a second frequency equal to or within 1500 cm$^{-1}$, more preferably within 1000 cm$^{-1}$, and most preferably within 500 cm$^{-1}$, of the first frequency.

In one embodiment, said first frequency is typically in the range of about 5000 to about 9000 cm$^{-1}$, preferably about 5500 to about 7500 cm$^{-1}$. In another embodiment, said first frequency is typically in the range of about 9000 to about 15000 cm$^{-1}$, preferably about 9500 to about 11500 cm$^{-1}$ or about 11500 to about 13000 cm$^{-1}$. In yet another embodiment, said first frequency is typically in the range of about 15000 to about 25000 cm$^{-1}$, preferably about 15000 to about 17500 cm$^{-1}$ or about 17000 to about 20000 cm$^{-1}$. In a further embodiment, said first frequency is typically in the range of about 25000 to about 50000 cm$^{-1}$.

The present luminescent composition comprises a host lattice and at least one dopant atom that emits radiation and is commonly referred to as an activator. Emission of electromagnetic radiation by a dopant atom results when the electronic excited state of this type of dopant atom is populated. The excited state of the activator type of dopant atom may be populated by the absorption of electromagnetic radiation directly by the dopant atom or by energy transfer from another excited state. In some cases, a second type of dopant atom is used whose function is to absorb the incident radiation and transfer the resulting excited state energy to the activator ion. This type of dopant atom is commonly referred to as a sensitizer. For the purposes of this invention, it is only necessary to have at least one type of activator dopant atom present for the luminescent composition to function, while the presence of at least one type of sensitizer dopant atom is optional.

In one aspect, the present invention resides in a luminescent composition that comprises the absorption of radiation by at least one (type of) dopant atom and emission of radiation by at least one (type of) dopant atom with a relatively small Stoke's shift. A Stoke's shift is the change to a lower energy of the emitted radiation compared to that of the absorbed radiation. In one aspect, this process involves only a single, activator, type of dopant atom. In a second aspect, this process involves absorption of the radiation into the sensitizer type of dopant and emission of the radiation by the activator type of dopant.

In a further aspect of the invention, the intensity and persistence of the emission can be affected by the presence of a parasitic type of dopant atom that interacts with the electronic excited state of the activator atom. In one aspect of the invention, the parasitic type of dopant atoms can be the same as the activator type of dopant atom. In another aspect of the invention, the parasitic type of dopant atoms can be the same as the sensitizer type of dopant atom. In yet another aspect of the invention, the parasitic type of dopant atom can be different than either the activator or sensitizer. In one aspect the parasitic dopant atoms may deplete the excited state energy by an energy transfer mechanism. In another aspect the parasitic dopant atoms may deplete the excited state energy by an electron transfer mechanism. The extent to which the intensity and persistence of the emission from the activator type of dopant atom is affected by the presence of the parasitic type of dopant atom can be affected by the amounts and ratios of all of the types of dopant atoms in the luminescent composition.

In a further aspect of the invention, at least one parasitic type of dopant atom can itself emit electromagnetic radiation. This emission may optionally be observed (used) with the emission of the activator type of dopant atom in a detection scheme. The parasitic dopant type may also serve to deplete the excited state of the (emitting) activator type of dopant. This will change the brightness and decrease the lifetime of the luminescence.

As with any doped inorganic phosphor, the identity of the host lattice is critical to the performance of the phosphor because it influences the electronic environment of the dopant atom(s) and the non-radiative decay pathways for electronic excited states. In principal, any host lattice may be used herein if it is possible to incorporate at least one type of luminescent dopant atom into said host lattice to result in a luminescent composition. Examples of host lattices which may be useful include compounds comprising a cation containing at least one element selected from Groups 2, 3, 12, 13, 14 and 15 of the Periodic Table and the lanthanide elements, and an anion containing at least one element selected from Groups 13, 14, 15, 16 and 17 of the Periodic Table. Typically, the, or each, cation element is selected from yttrium, lanthanum, gadolinium, lutetium, zinc, magnesium, calcium, strontium, barium, boron, aluminum, gallium, silicon, germanium, and phosphorous and the, or each, anion element is selected from nitrogen, arsenic, oxygen, sulfur, selenium, fluorine, chlorine, bromine, and iodine.

The dopant is typically an ion of at least one lanthanide element and in particular the oxidation state of the lanthanide element dopant is preferably such that the ion has no free d electrons. Suitable lanthanide elements for the dopant ion comprise praseodymium, neodymium, samarium, europium, terbium, dysprosium, holmium, erbium, thulium and ytterbium, with holmium, erbium, thulium and ytterbium being particularly preferred. Generally, the dopant is also present as an oxygen-containing compound, such as a metal oxide, a silicate, borate, oxysulfide or aluminate.

The amount of dopant present in the luminescent composition is not narrowly defined and generally can range from about 0.1 to about 99 mole %, such as from about 1 to about 30 mole %, for example from about 5 to about 25 mole %, of the total luminescent composition.

As-synthesized, the luminescent composition is in the form of a powder with particles having a small average size. Although the preferred average size of the phosphor particles will vary according to the application of the phosphor powder, the average particle size of the phosphor particles is less than about 10 µm. For most applications, the average particle size is preferably less than about 5 µm, more preferably less than about 3 µm, such as from about 0.1 µm to about 3 µm, typically about 2 µm. As used herein, the average particle size is the weight average particle size.

In a further embodiment of this invention, it is often desirable for the luminescent particles to be "invisible" to the naked eye in the final printed or coated structure. In order for the particles to disappear in the final structure their ability to scatter light should be minimized. As a result the particles should have microstructures that avoid characteristic lengths that are between 150 and 600 nm. There are a number of ways to avoid this characteristic length. The powder batch should not contain a significant mass of particles in this size range, i.e., preferably less than 30 weight percent of the mass should be less than 600 nm. The powder batch should not comprise particles that while their overall dimensions are not in this size range, their substructure should also not be in this size range. Therefore the powder batch should not comprise particles that contain crystallites in the 150 nm to 600 nm size range. Also, where hollow particles are present, the wall thicknesses should also not be in the size range of between 150 nm to 600 nm. Particles with substructure with a characteristic dimension of less than 150 nm or more than 600 nm are preferred to avoid light scattering and therefore avoid an obvious "white" appearance when incorporated into a layer.

The powder batch of phosphor particles also has a narrow particle size distribution, such that the majority of particles are substantially the same size. Preferably, at least about 90 weight percent of the particles and more preferably at least about 95 weight percent of the particles are not larger than twice the average particle size. Thus, when the average particle size is about 2 µm, it is preferred that at least about 90 weight percent of the particles are not larger than 4 µm and it is more preferred that at least about 95 weight percent of the particles are not larger than 4 µm. Further, it is preferred that at least about 90 weight percent of the particles, and more preferably at least about 95 weight percent of the particles, are not larger than about 1.5 times the average particle size. Thus, when the average particle size is about 2 µm, it is preferred that at least about 90 weight percent of the particles are not larger than about 3 µm and it is more preferred that at least about 95 weight percent of the particles are not larger than about 3 µm.

The phosphor particles can be substantially single crystal particles or may be comprised of a number of crystallites. Preferably, the phosphor particles are highly crystalline with the average crystallite size approaching the average particle size, such that the particles are mostly single crystals or are composed of only a few large crystals. The average crystallite size of the particles is preferably at least about 25 nm, more preferably is at least about 40 nm, even more preferably is at least about 60 nm and most preferably is at least about 80 nm. In one embodiment, the average crystallite size is at least about 100 nm. As it relates to particle size, the average crystallite size is preferably at least about 20 percent, more preferably at least about 30 percent and most preferably is at least about 40 percent of the average particle size. Such highly crystalline phosphors are believed to have increased luminescent efficiency and brightness as compared to phosphor particles having smaller crystallites.

The phosphor particles are also preferably substantially spherical in shape. That is, the particles are not jagged or irregular in shape. Spherical particles are particularly advantageous because they are able to disperse and coat a device, such as a display panel, more uniformly with a reduced average thickness. Although the particles are substantially spherical, the particles may become faceted as the crystallite size increases and approaches the average particle size.

The phosphor particles advantageously have a high degree of purity, that is, a low level of impurities. Impurities are those materials that are not intended in the final product. Thus, an activator ion is not considered an impurity. The level of impurities in the present phosphor powders is preferably not greater than about 1 atomic percent, more preferably not greater than about 0.1 atomic percent, and even more preferably not greater than about 0.01 atomic percent. In addition, the surfaces of the phosphor particles are typically smooth and clean with a minimal deposition of contaminants on the particle surface. For example, the outer surfaces are not contaminated with surfactants, as is often the case with particles produced by liquid precipitation routes.

Density may be controlled to vary between highly dense particles to porous particles to hollow particles.

In addition, the phosphor particles advantageously have a low surface area. The particles are substantially spherical, which reduces the total surface area for a given mass of powder. Further, the elimination of larger particles from the powder batches eliminates the porosity that is associated with open pores on the surface of such larger particles. Due to the elimination of the large particles, the powder advantageously has a lower surface area. Surface area is typically measured using a BET nitrogen adsorption method which is indicative of the surface area of the powder, including the surface area of accessible surface pores on the surface of the powder. For a given particle size distribution, a lower value of a surface area per unit mass of powder indicates solid or non-porous particles. Decreased surface area reduces the susceptibility of the phosphor powders to adverse surface reactions, such as degradation from moisture. This characteristic can advantageously extend the useful life of the phosphor powders.

Further, the powder batches of phosphor particles are substantially unagglomerated, that is, they include substantially no hard agglomerates or particles. Hard agglomerates are physically coalesced lumps of two or more particles that behave as one large particle. Agglomerates are disadvantageous in most applications of phosphor powders. It is preferred that no more than about 1 weight percent of the phosphor particles in the powder batch of the present invention are in the form of hard agglomerates. More preferably, no more than about 0.5 weight percent of the particles are in the form of hard agglomerates and even more preferably no more than about 0.1 weight percent of the particles are in the form of hard agglomerates.

The present compositions also have well-controlled color characteristics, sometimes referred to as emission spectrum characteristics or chromaticity. This important property is due to the ability to precisely control the composition of the host material, the homogenous distribution of the activator ion and the high purity of the powders.

In addition, the present phosphor powders have improved decay time, also referred to as persistence. Persistence is referred to as the amount of time for the light emission to decay to 10 percent of its brightness. The improved decay time of the present phosphor powders is believed to be due to the high crystallinity of the host lattice and homogenous distribution of activator ion in the host material.

According to one embodiment of the present invention, the phosphor particles are provided with a surface coating that substantially encapsulates the outer surface of the particles. Such coatings can assist in reducing degradation of the phosphor material due to moisture or other influences and can also create a diffusion barrier such that activator ions cannot transfer from one particle to another, thereby altering the luminescent characteristics. Coatings can also control the surface energy levels of the particles.

The coating can be a metal, metal oxide or other inorganic compound such as a metal sulfide, or can be an organic compound. For example, a metal oxide coating can advantageously be used, such as a metal oxide selected from the group consisting of $SiO_2$, $MgO$, $Al_2O_3$, $ZnO$, $SnO_2$ or $In_2O_3$. Particularly preferred are coatings $SiO_2$ and $Al_2O_3$. Semiconductive oxide coatings such as $SnO_2$ or $In_2O_3$ can also be advantageous in some applications due to the ability of the coating to absorb secondary electrons that are emitted by the phosphor. Metal coatings, such as copper, can be useful for phosphor particles used in direct current electroluminescent applications In addition, phosphate coatings, such as zirconium phosphate or aluminum phosphate, can also be advantageous for use in some applications.

The coating should encapsulate the entire particle, but should be sufficiently thin that the coating does not interfere with light transmission. Preferably, the coating has an average thickness of at least about 2 nm, more preferably at least about 5 nm, but not greater than about 200 nm, more preferably not greater than about 100 nm, and even more preferably not greater than about 50 nm. In one embodiment, the coating has a thickness of from about 2 to about 50 nm, such as from about 2 to about 10 nm. Further, the particles can include more than one coating substantially encapsulating the particles to achieve the desired properties.

The coating, either particulate or non-particulate, can also include a pigment or other material that alters the light characteristics of the phosphor. Red pigments can include compounds such as the iron oxides ($Fe_2O_3$), cadmium sulfide compounds (CdS) or mercury sulfide compounds (HgS). Green or blue pigments include cobalt oxide (CoO), cobalt aluminate ($CoAl_2O_4$) or zinc oxide (ZnO). Pigment coatings are capable of absorbing selected wavelengths of light leaving the phosphor, thereby acting as a filter to improve the color contrast and purity.

In addition, the phosphor particles can be coated with an organic compound, such as PMMA (polymethylmethacrylate), polystyrene or similar organic compounds, including surfactants that aid in the dispersion and/or suspension of the particles in a flowable medium. The organic coating is preferably not greater than about 100 nm thick and is substantially dense and continuous about particle. The organic coatings can advantageously prevent corrosion of the phosphor particles, especially in electroluminescent lamps, and also can improve the dispersion characteristics of the particles in a paste or other flowable medium.

The coating can also be comprised of one or more monolayer coatings, such as from about 1 to 3 monolayer coatings. A monolayer coating is formed by the reaction of an organic or an inorganic molecule with the surface of the phosphor particles to form a coating layer that is essentially one molecular layer thick. In particular, the formation of a monolayer coating by reaction of the surface of the phosphor powder with a functionalized organosilane such as halo- or amino-silanes, for example hexamethyldisilazane or trimethylsilylchloride, can be used to modify and control the hydrophobicity and hydrophilicity of the phosphor powders. Metal oxides (e.g. ZnO or $SiO_2$) or metal sulfides (e.g. $Cu_2S$) can also be formed as monolayer coatings. Monolayer coatings can allow for greater control over the dispersion characteristics of the phosphor powder in a wide variety of paste compositions and other flowable mediums.

The monolayer coatings may also be applied to phosphor powders that have already been coated with an organic or inorganic coating, thus providing better control over the corrosion characteristics (through the use of a thicker coating) as well as dispersibility (through the use of a monolayer coating) of the phosphor powder.

Method of Making the Luminescent Composition

The particulate luminescent composition of the present invention can be produced by any known method that generates spherical particles of the required size and size distribution. Suitable methods include spray pyrolysis and pyrolysis using a flame reactor, as discussed in more detail below. In addition, a modification of these methods can be used in a gas dispersion process to produce nanoparticles dispersed in a matrix.

Spray Pyrolysis

Spray pyrolysis involves initially preparing a liquid feed containing at least one precursor for the desired particulate product in a liquid medium, converting the liquid feed to aerosol form, in which droplets of the liquid feed are dispersed in and suspended by a carrier gas, and then removing the liquid from the droplets to permit formation of the desired particles in a dispersed state. The particles are then collected in a particle collector to recover the particulate product. Typically, the feed precursor is pyrolyzed in a furnace to make the particles. In one embodiment, the particles are subjected, while still in a dispersed state, to compositional or structural modification, if desired. Compositional modification may include, for example, coating the particles. Structural modification may include, for example, crystallization, recrystallization or morphological alteration of the particles.

The liquid feed includes one or more flowable liquids as its major constituent(s), such that the feed is flowable. However, the liquid feed need not comprise only liquid constituents and can, for example, also include particulate material suspended in a liquid phase. The liquid feed must, however, be capable of being atomized to form droplets of sufficiently small size for preparation of an aerosol. Therefore, if the liquid feed includes suspended particles, those particles should be relatively small in relation to the size of droplets in the aerosol. Such suspended particles should typically be smaller than about 1 µm in size, preferably smaller than about 0.5 µm in size, and more preferably smaller than about 0.3 µm in size and most preferably smaller than about 0.1 µm in size. Most preferably, the suspended particles should be able to form a colloid. The suspended particles could be finely divided particles, or could be agglomerate masses comprised of agglomerated smaller primary particles. For example, 0.5 µm particles could be agglomerates of nanometer-sized primary particles. When the liquid feed includes suspended particles, the particles typically comprise no greater than about 25 to 50 weight percent of the liquid feed.

The liquid feed includes at least one precursor for preparation of the desired luminescent composition particles. Typically, the precursor will be a material, such as a salt, dissolved in a liquid solvent of the liquid feed. The precursor may undergo one or more chemical reactions in the furnace to assist in production of the particles. Alternatively, the precursor material may contribute to formation of the luminescent composition without undergoing chemical reaction. For example, the liquid feed can include a solution, preferably an aqueous solution, containing a nitrate, chloride, sulfate, hydroxide or oxalate of the desired phosphor compound(s). Preferred precursors are nitrates, such as yttrium nitrate, $Y(NO_3)_3 6H_2O$, since nitrates are typically highly soluble in water and the solutions maintain a low viscosity, even at high concentrations. The solution is preferably not saturated with the precursor to avoid precipitate formation in the liquid. The solution preferably includes, for example, sufficient precursor to yield from about 1 to 50 weight percent, such as from about 1 to 15 weight percent, of the phosphor compound, based on the amount of metals in solution. The final particle size of the phosphor particles is also influenced by the precursor concentration. Generally, lower precursor concentrations in the liquid feed will produce particles having a smaller average size.

In addition to the host material, the liquid feed preferably includes the precursor to the activator ion. For example, for the production of $Y_2O_3$:Yb phosphor particles, the precursor solution preferably includes yttrium nitrate, as is discussed above, and also ytterbium nitrate. The relative concentrations of the precursors can be adjusted to vary the concentration of the activator ion in the host material.

Preferably, the solvent is aqueous-based for ease of operation, although other solvents, such as toluene, may be desirable. The use of organic solvents can lead to undesirable carbon contamination in the phosphor particles. The pH of the aqueous-based solutions can be adjusted to alter the solubility characteristics of the precursor in the solution.

In addition to the foregoing, the liquid feed may also include other additives that contribute to the formation of the phosphor particles. For example, it is sometimes desirable to incorporate additives such as urea, carboxylic acids, especially citric acid, alcohols, and inorganic salts in the liquid feed, for a variety of reasons including, but not limited to, affecting the morphology of the product powder, influencing the rate of powder formation, influencing the crystallinity of the powder formed, influencing the average size of the powder particles, and influencing the behavior of the powder during subsequent heat-treatment. For example, the addition of urea to metal salt solutions, such as a metal nitrate, can increase the crystallinity and density of particles produced from the solution. In one embodiment, up to about 1 mole equivalent urea is added to the precursor solution, as measured against the moles of phosphor compound in the metal salt solution. Further, if the particles are to be coated phosphor particles, a soluble precursor to both the oxygen-containing phosphor compound and the coating can be used in the precursor solution wherein the coating precursor is an involatile or volatile species.

The liquid feed is converted to an aerosol by means of an aerosol generator that atomizes the liquid feed to form droplets in a manner to permit the carrier gas to sweep the droplets away to form the aerosol. Conveniently, the aerosol generator comprises one or more ultrasonic transducers arranged to transmit ultrasonic energy via an ultrasonically transmissive fluid, preferably water, to the liquid feed. One such suitable aerosol generator is shown in U.S. Pat. No. 6,180,029, the entire contents of which are incorporated herein by reference. In this way, it is possible to generation an aerosol with droplets of a small average size and narrow size distribution.

In particular, the aerosol droplets conveniently have a weight average size in a range having a lower limit of about 1 µm and preferably about 2 µm; and an upper limit of about 100 µm; preferably less than 50 µm, more preferably less than or equal to 40 µm; preferably about 7 µm, more preferably about 5 µm and most preferably about 4 µm. In addition, the droplets in the aerosol are preferably such that at least about 70 percent (more preferably at least about 80 weight percent and most preferably at least about 85 weight percent) of the droplets are smaller than about 10 μm and more preferably at least about 70 weight percent (more preferably at least about 80 weight percent and most preferably at least about 85 weight percent) are smaller than about 5 μm. Further, preferably no greater than about 30 weight percent, more preferably no greater than about 25 weight percent and most preferably no greater than about 20 weight percent, of the droplets in the aerosol are larger than about twice the weight average droplet size.

The aerosol generator is operated so as to produce an aerosol with a high loading, or high concentration, of the liquid feed in droplet form. In particular, the aerosol preferably includes greater than about $1 \times 10^6$ droplets per cubic centimeter of the aerosol, more preferably greater than about $5 \times 10^6$ droplets per cubic centimeter, still more preferably greater than about $1 \times 10^7$ droplets per cubic centimeter, and most preferably greater than about $5 \times 10^7$ droplets per cubic centimeter. Typically, droplet loading in the aerosol is such that the volumetric ratio of liquid feed to carrier gas in the aerosol is larger than about 0.04 milliliters of liquid feed per liter of carrier gas, preferably larger than about 0.083 milliliters of liquid feed per liter of carrier gas, more preferably larger than about 0.167 milliliters of liquid feed per liter of carrier gas, still more preferably larger than about 0.25 milliliters of liquid feed per liter of carrier gas, and most preferably larger than about 0.333 milliliters of liquid feed per liter of carrier gas.

The carrier gas may comprise any gaseous medium in which droplets produced from the liquid feed may be dispersed in aerosol form. For example, the carrier gas may be inert, in that the carrier gas does not participate in formation of the phosphor particles. Alternatively, the carrier gas may have one or more active component(s) that contribute to formation of the phosphor particles. In that regard, the carrier gas may include one or more reactive components that react in the furnace to contribute to formation of the particles. For producing oxygen-containing phosphor particles, air is a satisfactory carrier gas. In other instances, a relatively inert gas such as nitrogen may be required.

The carrier gas is employed to transport the droplets produced by the aerosol generator to a heated wall furnace that evaporates the liquid from the droplets and, if necessary, converts the precursor compounds to the desired phosphor particles. Typically, the furnace includes a heating zone which is maintained at a temperature of from about 125° C. to about 1500° C., preferably from about 300° C. to about 1100° C., and through which the aerosol is passed. Although longer residence times are possible, for many applications, residence times in the heating zone of the furnace shorter than about 4 seconds are typical, with shorter than about 2 seconds being preferred, shorter than about 1 second being more preferred, shorter than about 0.5 second being even more preferred, and shorter than about 0.2 second being most preferred. The residence time should be long enough, however, to assure that the aerosol droplets attain the desired maximum stream temperature for a given heat transfer rate.

Typically, the furnace is a tube-shaped furnace, with the aerosol entering the furnace at one end thereof and exiting the furnace through an outlet at its opposite end. Also, in most cases, it is preferred that the maximum stream temperature not be attained in the furnace until substantially the outlet end of the heating zone in the furnace. For example, the heating zone will often include a plurality of heating sections that are each independently controllable. The maximum stream temperature should typically not be attained until the final heating section, and more preferably until substantially at the outlet end of the last heating section. This helps to reduce the potential for thermophoretic losses of material.

After passage through the furnace, the carrier gas with the phosphor particles entrained therein is passed to a particle collector, which may be any suitable apparatus for collecting phosphor particles to produce the desired particulate product. One preferred embodiment of the particle collector uses one or more filters to separate the phosphor particles from the carrier gas. Such a filter may be of any type, including a bag filter. Another preferred embodiment of the particle collector uses one or more cyclones to separate the particles. Other apparatus that may be used in the particle collector includes an electrostatic precipitator. Also, collection should normally occur at a temperature above the condensation temperature of the gas stream in which the particles are suspended. Also, collection should normally be at a temperature that is low enough to prevent significant agglomeration of the particles. Generally, collection is effected at a temperature of about 15° C. to about 250° C., preferably 40° C. to about 140° C.

With some applications, it may be possible to collect the phosphor particles directly from the outlet of the furnace. More often, however, it will be desirable to cool the particles exiting the furnace prior to collection of the particles in the particle collector. Although any cooling apparatus capable of cooling the phosphor particles to the desired temperature for introduction into the particle collector may be employed, traditional heat exchanger designs are not preferred. This is because a traditional heat exchanger would ordinarily directly subject the aerosol stream, in which the hot particles are suspended, to cool surfaces. In that situation, significant losses of the particles can occur due to thermophoretic deposition of the hot particles on the cool surfaces of the heat exchanger. More preferably, a gas quench apparatus is used as the particle cooler since this significantly reduces thermophoretic losses compared to a traditional heat exchanger.

Where it desired to produce coated phosphors, precursors to metal oxide coatings can be added to the liquid medium fed to spray pyrolysis process. Suitable precursors include volatile metal acetates, chlorides, alkoxides or halides since such precursors are known to react at high temperatures to form the corresponding metal oxides and eliminate supporting ligands or ions. For example, $SiCl_4$ can be used as a precursor to $SiO_2$ coatings when water vapor is present, whereas $AlCl_3$ is a useful volatile precursor for $Al_2O_3$ coatings. Similarly, metal alkoxides can be used to produce metal oxide films by hydrolysis and, since most metal alkoxides have a reasonably high vapor pressure, they are well suited as coating precursors. Metal acetates are also useful as coating precursors since they readily decompose upon thermal activation by acetic anhydride elimination: Metal acetates are also advantageous as coating precursors since they are water stable and are reasonably inexpensive.

Coatings can be generated on the particle surface by a number of different mechanisms. One or more precursors can vaporize and fuse to the hot phosphor particle surface and thermally react resulting in the formation of a thin-film coating by chemical vapor deposition (CVD). Preferred coatings deposited by CVD include metal oxides and elemental metals. Further, the coating can be formed by physical vapor deposition (PVD) wherein a coating material physically deposits an the surface of the particles. Preferred coatings deposited by PVD include organic materials and elemental metal. Alternatively, the gaseous precursor can react in the gas phase forming small particles, for example less than about 5 nanometers in size, which then diffuse to the larger particle surface and sinter onto the surface, thus forming a coating. This method is referred to as gas-to-particle conversion (GPC). Whether such coating reactions occur by CVD, PVD or GPC is dependent on the reactor conditions such as precursor partial pressure, water partial pressure and the concentration of particles in the gas stream. Another possible surface coating method is surface conversion of the surface of the particle by reaction with a vapor phase reactant to convert the surface of the particles to a different material than that originally contained in the particles.

In addition, a volatile coating material such as PbO, $MoO_3$ or $V_2O_5$ can be introduced into the reactor such that the coating deposits on the particle by condensation. Highly volatile metals, such as silver, can also be deposited by condensation. Further, the phosphor powders can be coated using other techniques. For example, a soluble precursor to both the phosphor powder and the coating can be used in the precursor solution wherein the coating precursor is involatile (e.g. $Al(NO_3)_3$) or volatile (e.g. $Sn(OAc)_4$ where Ac is acetate). In another method, a colloidal precursor and a soluble phosphor precursor can be used to form a particulate colloidal coating on the phosphor.

Further details of the spray pyrolysis process can be found in our U.S. Pat. No. 6,180,029, the entire contents of which are hereby incorporated herein as if set forth herein in full.

Flame Reactor Process

By a flame reactor, it is meant a reactor having an internal reactor volume directly heated by one or more than one flame when the reactor is operated. By directly heated, it is meant that the hot discharge of a flame flows into the internal reactor volume. By the term flame, it is meant a luminous combustion zone.

In the flame reactor process, a nongaseous precursor of at least one component of the desired particulate luminescent composition is introduced into a flame reactor heated by at least one flame. The nongaseous precursor is introduced into the flame reactor in a very hot zone, also referred to herein as a primary zone, that is sufficiently hot to cause the component of the nongaseous precursor to be transferred into the gas phase of a flowing stream in the flame reactor, followed by a particle nucleation from the gas phase. Typically the temperature in at least some portion of this primary zone, and sometimes only in the hottest part of the flame, is high enough so that substantially all of the materials flowing through that portion of the primary zone are in the gas phase. The component of the nongaseous precursor may enter the gas phase by any mechanism. For example, the nongaseous precursor may simply vaporize, or the nongaseous precursor may decompose and the component enters the gas phase as part of a decomposition product. Eventually, however, the component then leaves the gas phase as particle nucleation and growth occurs. Removal of the component from the gas phase may involve simple condensation as the temperature cools or may include additional reactions involving the component that results in a non-vapor reaction product. In addition to this primary zone where the component of the nongaseous precursor is transferred into the gas phase, the flame reactor may also include one or more subsequent zones for growth or modification of the nanoparticulates. In most instances, the primary zone will be the hottest portion within the flame reactor.

By nongaseous, it is meant that the precursor is not in a vapor state. Rather, as introduced into the flame reactor, the nongaseous precursor will be, or be part of, one or more of a liquid, a solid or a supercritical fluid. For example, the nongaseous precursor may be contained in a liquid phase, solid phase or supercritical fluid phase of feed to the flame reactor. In one convenient and preferred implementation during introduction into the reactor, the nongaseous precursor is contained within a nongaseous disperse material, such as in disperse droplets, particles. For example, the nongaseous precursor may be contained in droplets of liquid sprayed into the flame or into a hot zone in the internal reactor volume. In one embodiment, the nongaseous precursor will be in a disperse phase of a flowing feed stream, in which the disperse phase is dispersed in a gas phase when introduced into the flame reactor. In yet another embodiment, the nongaseous precursor may be dissolved in a supercritical fluid that is introduced into the flame reactor. As the supercritical fluid expands upon introduction into the flame reactor, typically to a gaseous state, the capacity of the fluid as a solvent is reduced and the nongaseous precursor precipitates. A preferred supercritial fluid is carbon dioxide although other supercritical fluids could be used instead.

The nongaseous precursor includes at least one component for inclusion in the particulate luminescent composition. By "component" it is meant at least some identifiable portion of the nongaseous precursor that becomes a part of the luminescent composition. For example, the component could be the entire composition of the nongaseous precursor when that entire composition is included in the luminescent composition. More often, however, the component will be something less than the entire composition of the nongaseous precursor, and may be only a constituent element present in both the composition of the nongaseous precursor and the luminescent composition. For example, it is often the case that in the flame reactor the nongaseous precursor decomposes, and one or more than one element in a decomposition product then becomes part of the luminescent composition, either with or without further reaction of the decomposition product.

The nongaseous precursor is preferably in a nongaseous dispersed phase when introduced into the flame reactor. The dispersed phase may be for example, in the form of droplets or particles. The term "droplet" used in reference to such a dispersed phase refers to a dispersed domain characterized as including liquid (often the droplet is formed solely or predominantly of liquid, although the droplet may comprise multiple liquids, phases and/or particles suspended in the liquid). The term "particle" used in reference to such a dispersed phase refers to a dispersed domain characterized as being solid. The term "solid" is in relation to such particles not used in a technical material property sense to denote crystalline structure, but rather that the material is hard and substantially not flowable. Such "solid" materials may be amorphous.

In the case of droplets, the liquid may include one or more than one of any of the following liquid phases: organic, aqueous, and organic/aqueous mixtures. In addition to one or more liquid phases, the droplets may also contain one or more than one type of solid particulate. Some non-limiting examples of organic liquids that may be included in the droplets include alcohols (e.g., methanol, ethanol, isopropanol, butanol), organic acids, glycols, aldehydes, ketones, ethers, waxes, or fuel oils (e.g., kerosene or diesel oil). In addition to or instead of the organic liquid, the liquid in the dispersed phase may include an inorganic liquid, which will typically be aqueous-based. Some non-limiting examples of such inorganic liquids include water and aqueous solutions, which may be pH neutral, acidic or basic. A liquid of the droplets may include a mixture of mutually soluble liquid components, or the droplets may contain multiple distinct liquid phases (e.g., an emulsion). Liquid in droplets may be a mixture of two or more mutually soluble liquid components. For example, a liquid phase could comprise a mixture of mutually soluble organic liquids or a mixture of water with one or more organic liquids that are mutually soluble with water (e.g., some alcohols, ethers, ketones, aldehydes, etc.). Droplets may also include multiple liquid phases, such as in an emulsion. For example, a droplet could include an oil-in-water or a water-in-oil emulsion. In addition to multiple liquid phases, the droplets may include multiple liquid phases and one or more solid phases (i.e., suspended particles). As one example, the droplets may include an aqueous phase, an organic phase and a solid particle phase. As another example, the droplets may include an organic phase, particles of a first composition and particles of a second composition.

Moreover, a liquid, or component thereof, in the dispersed phase droplets may have a variety of functions. For example, a liquid in the dispersed phase may be a solvent for the nongaseous precursor, and the nongaseous precursor may be dissolved in the liquid when introduced into the flame reactor. As another example, a liquid in the dispersed phase may be or include a component that is a fuel or an oxidant for combustion in a flame of the flame reactor. Such fuel or oxidant in the liquid may be the primary or a supplemental fuel or oxidant for driving the combustion in a flame. Liquid in the dispersed phase may provide one or more of any of these or other functions.

Dispersed phase droplets may also comprise particles suspended in the liquid of the droplets. Such suspended particles may be or comprise the non-gaseous precursor, a fuel or an oxidant, or may serve some other function, and the particles may comprise organic and/or inorganic constituents. As with the discussions above concerning fuel or oxidant in a liquid, fuel or oxidant in such suspended particulates may be primary or supplemental for combustion in a flame of the flame reactor.

When the dispersed phase is disperse particles rather than disperse droplets, the dispersed particles include the nongaseous precursor. Such disperse phase particles may also have one or more component serving other functions, such as for example a fuel and/or an oxidant for combustion in the flame, in the same manner as discussed above with respect to particles that may be suspended in droplets.

As previously stated, the dispersed phase has a nongaseous precursor that includes a component for inclusion in the luminescent composition, and the nongaseous precursor may be formulated in the disperse phase liquid and/or solid material for introduction into the flame reactor. In a preferred implementation, the nongaseous precursor is initially dissolved in a liquid medium and the liquid medium, which may contain suspended solids, is then atomized to form droplets and the droplets are then fed directly to the flame reactor or are predried to form particles that are then fed to the flame reactor. Some non-limiting examples of classes of materials that may be used as the nongaseous precursor include: nitrates, oxalates, acetates, acetyl acetonates, carbonates, acrylates and chlorides.

In another preferred embodiment, the nongaseous precursor is introduced into the flame reactor dispersed in a gas phase. The gas phase may include any combination of gas components in any concentration. The gas phase may include only components that are inert (i.e. nonreactive) in the flame reactor or the gas phase may comprise one or more reactive components (i.e., decompose or otherwise react in the flame reactor). When nongaseous precursor is fed to a flame, the gas phase may comprise a gaseous fuel and/or oxidant for combustion in the flame. A non-limiting example of a gaseous oxidant is gaseous oxygen, which could be provided by making the gas phase from or including air. A non-limiting example of another possible gaseous oxidant is carbon monoxide. Non-limiting examples of gaseous fuels that could be included in the gas phase include hydrogen gas and gaseous organics, such as for example $C_1$-$C_y$ hydrocarbons (e.g., methane, ethane, propane, butane). Often, the gas phase will include at least oxidant (normally oxygen in air), and fuel will be delivered separately to the flame. Alternatively, the gas phase may include both fuel and oxidant premixed for combustion in a flame. Also, the gas phase may include a gas mixture containing more than one oxidant and/or more than one fuel. Also, the gas phase may include one or more than one gaseous precursor for a material of the luminescent composition, in addition to the nongaseous precursor in the disperse phase. The component provided by a gaseous precursor may be the same or different than the component provided by the nongaseous precursor. One situation when the gas phase often includes a gaseous precursor is when making luminescent compositions including an oxide material, and the gaseous precursor is oxygen gas. Sufficient oxygen gas must be included, however, to provide excess over that consumed by combustion when the nongaseous precursor is fed to the flame. Moreover, the gas phase may include any other gaseous component that is not inconsistent with manufacture of the desired luminescent composition, or that serves some function other than those noted above.

As noted previously, the flame reactor includes one or more than one flame that directly heats an interior reactor volume. Each flame of the flame reactor will typically be generated by a burner, through which oxidant and the fuel are fed to the flame for combustion. The burner may be of any suitable design for use in generating a flame, although the geometry and other properties of the flame will be influenced by the burner design. Each flame of the flame reactor may be oriented in any desired way. Some non-limiting examples of orientations for the flame include horizontally extending, vertically extending or extending at some intermediate angle between vertical and horizontal. When the flame reactor has a plurality of flames, some or all of the flames may have the same or different orientations.

Each flame of the flame reactor will often be associated with an ignition source that ignites the oxidant and fuel to generate the flame. In some instances, the ignition source will be one or more pilot flames that in addition to providing an initial ignition source to start the combustion of the oxidant and the fuel, may also provide a continual ignition/energy source that sustains the flame of the flame reactor. The pilot flame may be generated from the same oxidant and fuel used to generate the main flame, or from a different fuel and/or oxidant. For example, when using the same fuel, a pilot flame may be generated using a small stream of fuel flowed through one channel of a multi-channel burner used to generate a flame of the flame reactor. The small stream of fuel may be premixed with an oxidant or may consume oxygen from the ambient environment to generate the pilot flame. This is merely one example, and in other examples, the pilot flame may be generated using a separate burner. The ignition source is not limited to pilot flames, and in some cases the ignition source may be a spark or other ignition source.

One important aspect of a flame is its geometry, or the shape of the flame. Some geometries tend to provide more uniform flame characteristics, which promotes manufacture of the particles with relatively uniform properties. One geometric parameter of the flame is its cross-sectional shape at the base of the flame perpendicular to the direction of flow through the flame. This cross-sectional shape is largely influenced by the burner design, although the shape may also be influenced by other factors, such as the geometry of the enclosure and fluid flows in and around the flame. Other geometric parameters include the length and width characteristics of the flame. In this context the flame length refers to the longest dimension of the flame longitudinally in the direction of flow and flame width refers to the longest dimension across the flame perpendicular to the direction of flow. With respect to flame length and width, a wider, larger area flame, has potential for more uniform temperatures across the flame, because edge effects at the perimeter of the flame are reduced relative to the total area of the flame.

Discharge from each flame of the flame reactor flows through a flow path, or the interior pathway of a conduit, through the flame reactor. As used herein, "conduit" refers to a confined passage for conveyance of fluid through the flame reactor. When the flame reactor comprises multiple flames, discharge from any given flame may flow into a separate conduit for that flame or a common conduit for discharge from more than one of the flames. Ultimately, however, streams flowing from each of the flames generally combine in a single conduit prior to discharge from the flame reactor.

A conduit through the flame reactor may have a variety of cross-sectional shapes and areas available for fluid flow, with some non-limiting examples including circular, elliptical, square or rectangular. In most instances, however, conduits having circular cross-section are preferred. The presence of sharp corners or angles may create unwanted currents or flow disturbances that can aggregate deposition on conduit surfaces. Walls of the conduit may be made of any material suitable to withstand the temperature and pressure conditions within the flame reactor. The nature of the fluids flowing through the flame reactor may also affect the choice of materials of construction used at any location within the flame reactor. Temperature, however, may be the most important variable affecting the choice of conduit wall material. For example, quartz may be a suitable material for temperatures up to about 1200° C. As another example, for temperatures up to about 1500° C., possible materials for the conduit include refractory materials such as alumina, mullite or silicon carbide might be used. As yet another example, for processing temperatures up to about 1700° C., graphite or graphitized ceramic might be used for conduit material. As another example, if the flame reactor will be at moderately high temperatures, but will be subjected to highly corrosive fluids, the conduit may be made of a stainless steel material. These are merely some illustrative examples. The wall material for any conduit portion through any position of the flame reactor may be made from any suitable material for the processing conditions.

As noted previously, to form the desired particulate luminescent composition, including the component from the nongaseous precursor, the component is transferred through the gas phase in the flowing stream in the flame reactor. Following nucleation of the particles, the particles must then grow to the desired size. The transfer into the gas phase is driven by the high temperature in the flame reactor in the vicinity of where the nongaseous precursor is introduced. This may occur by any mechanism which may include simple vaporization of the nongaseous precursor or thermal decomposition or other reaction involving the nongaseous precursor. The transfer also includes removing the component from the gas phase, to permit inclusion in the particulate luminescent composition. Removal of the nongaseous precursor from the gas phase may likewise involve a variety of mechanisms, including simple condensation as the temperature of the flowing stream drops, precipitation due to high concentration in the gas phase, or a reaction producing a reaction to a nonvolatile reaction product. Also, it is noted that transfer into and out of the gas phase are not necessarily distinct steps, but may be occurring simultaneously, so that some of the component may still be transferring into the gas phase while some of the component is already transferring out of the gas phase.

Substantially all material in a feed stream of the nongaseous precursor should in one way or another be transferred into the gas phase in the flame reactor. For example, one common situation is for the feed to include droplets in which the nongaseous precursor is dissolved when introduced into the flame reactor. In this situation, liquid in the droplet must be removed as well. The liquid may simply be vaporized to the gas phase, which would typically be the case for water. Also, some or all of the liquid may be reacted to vapor phase products. As one example, when the liquid may contain fuel or oxidant that is consumed by combustion in a flame in the reactor, likewise, any solid fuel or oxidant in the feed would also be consumed and converted to gaseous combustion products.

In addition to the transfer into the gas phase, forming the desired luminescent product also includes growing nanoparticulates. Growing commences with particle nucleation and continues until the nanoparticulates attain a weight average particle size within a desired range. When making extremely small particles, the growing may mostly or entirely occur within the primary zone of the flame reactor immediately after the flame. However, when larger particle sizes are desired, processing may be required in addition to that occurring in the primary zone of the flame reactor. Such growth may occur due to collision and agglomeration of smaller particles into larger particles or through addition of additional material into the flame reactor for addition to the growing nanoparticulates. The growth of the nanoparticulates may involve added material of the same type as that already present in the nanoparticulates or addition of a different material.

During the growing, the nanoparticulates are typically grown to a weight average particle size in a range having a lower limit selected from the group consisting of 1 nm, 5 nm, 10 nm, 20 nm, 40 nm, 50 nm, 60 nm, 70 nm, 80 nm, 90 nm, 100 nm, 125 nm and 150 nm and an upper limit selected from the group consisting of 10 nm, 20 nm, 30 nm, 40 nm, 50 nm, 60 nm, 70 nm, 80 nm, 90 nm, 100 nm, 125 nm, 150 nm, 200 nm, 250 nm, 300 nm, 400 nm and 500 nm; provided that the upper limit is selected to be larger than the lower limit.

Especially when making larger nanoparticulates, it is important to provide sufficient residence time at sufficiently high temperature to permit the desired particle growth. These larger-size nanoparticulates are desirable for many applications, because the larger-size nanoparticulates are often easier to handle, easier to disperse for use and more readily accommodated in existing product manufacturing operations. By larger-size nanoparticulates it is generally meant those having a weight average particle size of at least 50 nm, more typically at least 70 nm and often at least 100 nm or even larger. It is important to emphasize that the size of the nanoparticulates as used herein refer to the primary particle size of individual nanoparticulate domains, and should not be confused with the size of aggregate units of necked-together primary particles. Unless otherwise specifically noted, particle size herein refers only to the size of the identifiable primary particles.

In producing larger nanoparticulates, at least a portion of the particle growth will typically be performed in a volume of a flame reactor downstream from the primary zone that is better suited for controllably growing nanoparticulates to within the desired weight average particle size range. This downstream portion of the flame reactor is referred to herein as a secondary zone to conveniently distinguish it from the primary zone discussed above. The secondary zone will typically be longer and occupy more of the internal reactor volume than the primary zone, and the residence time in the secondary zone will typically be significantly larger than in the primary zone. The temperature in the secondary zone is maintained below a temperature at which materials of the nanoparticulates would vaporize or thermally decompose, that is below the temperature in the primary zone, but above a sintering temperature of the nanoparticulates.

The residence time within the primary zone is generally less than one second, with the lower limit being selected from the group consisting of 1 ms, 10 ms, 100 ms, and 250 ms and the upper limit selected from the group consisting of 500 ms, 400 ms, 300 ms, 200 ms and 100 ms, provided that the upper limit is selected to be larger than the lower limit. The residence time within the secondary zone will typically be at least twice as long, four times as long, six times or ten times as long as the residence time in the primary zone (and also as the residence time in the flame). Often, the residence time in the secondary zone is at least an order of magnitude longer than the residence time in the primary zone. The residence time of the flowing stream in the secondary zone is often in a range having a lower limit selected from the group consisting of 50 ms, 100 ms, 500 ms, 1 second and 2 seconds and an upper limit selected from the group consisting of 1 second, 2 seconds, 3 seconds, 5 seconds and 10 seconds, provided that the upper limit is selected to be larger than the lower limit. The total residence for both the primary zone and the secondary zone is typically in a range having a lower limit selected from the group consisting of 100 ms, 200 ms, 300 ms, 500 ms and 1 second and an upper limit selected from the group consisting of 1 second, 2 seconds, 3 seconds, 5 seconds and 10 seconds, provided that the upper limit is selected to be larger than the lower limit.

In determining an appropriate residence time of the nanoparticulates in the secondary zone there are several considerations. Some of the considerations include the desired weight average particle size, the melting temperature (and sintering temperature) of materials in the nanoparticulates, the temperature within the secondary zone, residence time in the secondary zone and the volume concentration of the nanoparticulates in the flowing stream (volume of nanoparticulates/volume of per unit volume of the flowing stream).

In some cases, it may desirable to include a quench zone between the primary and secondary zones whereby a cooler quench medium can be mixed with the flowing stream leaving the primary zone to reduce the temperature of the flowing stream and any nanoparticulates therein before the flowing stream passes in to the secondary zone. A further quench zone may be provided downstream of the secondary zone. The quench medium used in the or each quench zone may be a gas or liquid and may be non-reactive or reactive with the flowing stream.

For a detailed description of the use of flame reactors to produce nanoparticulates, reference is directed to our co-pending U.S. Provisional Patent Application No. 60/645,985, filed Jan. 21, 2005, the entire contents of which are hereby incorporated herein as if set forth herein in full.

Gas Dispersion Process

In some cases, it is desirable to produce the luminescent composition as nanoparticles that are maintained in a dispersed state by a matrix, since in this way the tendency for the nanoparticles to agglomerate is obviated or alleviated. This is conveniently achieved by a gas dispersion process in which a flowing gas dispersion is generated such that dispersion includes a disperse phase dispersed in and suspended by a gas phase. As generated, the gas dispersion has a disperse phase of droplets of a precursor medium comprising a liquid vehicle and at least two precursors, at least one of the precursors being a precursor to the luminescent composition and at least one of the precursors being a precursor to the matrix. After generating the gas dispersion, the gas dispersion is processed in a particle forming step, in which liquid is removed from the droplets of the precursor medium and particles are formed that include nanoparticulates dispersed in the matrix.

The liquid vehicle of the precursor medium may be any liquid that is convenient and compatible for processing precursor(s) and reagent(s) that are to be included in the precursor medium to make the desired particles during the particle forming step. The liquid vehicle may be comprised of only a single liquid component, or may be a mixture of two or more liquid components, which may or may not be mutually soluble in the proportions of the mixture. The use of a mixture of liquid components is useful, for example, when the precursor medium includes multiple precursors, with one precursor having a higher solubility in one liquid component and the other precursor having a higher solubility in another liquid component. As one example, a first precursor may be more soluble in a first liquid component of the liquid vehicle and a second precursor may be more soluble in a second liquid component of the liquid vehicle, but the two components of the liquid vehicle may be mutually soluble so that the liquid vehicle has only a single liquid phase of the first liquid component, the second liquid component and the two dissolved precursors. Alternatively, the liquid vehicle may have two liquid components that are not mutually soluble, so that the liquid vehicle has two, or more, liquid phases (i.e., an emulsion) with one precursor dissolved in one liquid phase, for example a continuous phase, and a second precursor dissolved in a second liquid phase, for example a dispersed phase of an emulsion.

In some cases, the liquid vehicle may be selected to act as a solvent for one or more than one precursor to be included in the precursor medium, so that in the precursor medium all or a portion of the one or more than one precursor will be dissolved in the precursor medium. In other cases, the liquid vehicle will be selected based on its volatility. For example, a liquid vehicle with a high vapor pressure may be selected so that the liquid vehicle is easily vaporized and removed from the droplets to the gas phase of the gas dispersion during the particle forming step. In other cases, the liquid vehicle may be selected for its hydrodynamic properties, such as viscosity characteristics of the liquid vehicle. For example, a liquid vehicle having a relatively high viscosity may be selected to inhibit settling of the precursor particles. As another example, a liquid vehicle with a relatively low viscosity may be selected when it is desired to produce smaller droplets of precursor medium during the generating gas dispersion.

In still other cases, the liquid vehicle may be selected to reduce or minimize contamination of the particles and/or production of undesirable byproducts during the generating gas dispersion or the forming particles, especially when using organic components in the liquid vehicle. As one example, an important embodiment is to use a liquid vehicle that provides fuel for generating heat in a flame reactor. In this example, components of liquid vehicle may be chosen so as to reduce or minimize generation of undesirable byproducts from combustion of liquid vehicle components.

In addition to the liquid vehicle, the precursor medium also comprises at least two precursors. As noted previously, a precursor is a material that provides at least one component for inclusion in the particles made during particle formation. During particle formation, a precursor may undergo reaction to provide the component for the particles, (e.g., thermally decompose at elevated temperature). Alternatively, a precursor may be processed to provide the component of the particles without reaction, in which case the component provided by the precursor is the precursor material itself. For example, a precursor could process without reaction where the precursor is initially dissolved in the liquid vehicle and a precipitate of the precursor is included in the particles made during particle formation. This might be the case, for example, when the precursor medium initially contains a salt or a polymer dissolved in the liquid medium, which salt or polymer precipitates out to form all or part of the matrix when the liquid vehicle is vaporized during particle formation. As another example, the precursor could volatilize and then condense to form part of the particles made during particle formation. One particular implementation of this example is the use of a salt precursor for the matrix that vaporizes and then condenses onto nanoparticulates after formation of the nanoparticulates. In another particular implementation of this example, precursors for both the nanoparticulate and the matrix could volatilize, react if necessary, and then condense to form materials for inclusion in the multi-phase particles.

Because of their lower cost, some preferred precursors for the component(s) of the luminescent composition, include nitrates, acetates and chlorides. Examples include nitrates, hydroxides and carboxylates of yttrium, gallium, barium, calcium, strontium, germanium, gadolinium, europium, terbium, cerium, chromium, aluminum, indium, magnesium, praseodymium, erbium, thulium, praseodymium, manganese, silver, copper, zinc, sodium and dysprosium. Boric acid may be used as a phosphor precursor either as a coreactant and/or a fluxing agent.

As noted previously, the matrix includes one material or a combination of two or more materials that function to maintain the nanoparticulates at least partially and preferably completely separated in a dispersed state in the particles. Examples of some general types of materials for possible inclusion in the matrix include salts, polymers, metals (including alloys and intermetallic compounds), ceramics and inorganic carbon (such as graphitic or diamond-like carbon). In one particular implementation of the invention, the matrix comprises one or more than one salt material. Matrix salt materials are preferred, for example, for many applications when it is desired to have a matrix that is partially or wholly removable, because the salt material of the matrix can be selected to be dissolvable in a liquid medium that is not detrimental to the nanoparticulates. For water soluble salts, a convenient choice for the liquid medium is water or an aqueous solution, which may be neutral, basic or acidic depending upon the specific application and the specific matrix salt material to be dissolved. The matrix salt material may be an inorganic salt or an organic salt, with inorganic salts being generally more preferred.

In one preferred embodiment, the matrix comprises one or more than one polymer. It may be desirable to include a polymer material in the matrix for a variety of reasons. For example, a polymer may be selected for easy dissolution in a liquid medium to release the nanoparticulates for further processing or use. A polymer material that is soluble in an organic liquid may be selected when it is desired to disperse the nanoparticulates in an organic liquid during subsequent processing or use. As another example, a polymer may be selected as a permanent matrix material for use in some applications. When used as a permanent matrix, the polymer of the matrix may simply provide a structure to retain the nanoparticulate in a desired dispersion without interfering with proper functioning of the nanoparticulates in the application. Alternatively, the polymer may itself also provide some function for the application. The polymer may, for example, have a function that is different than that of the nanoparticulates, have a function that compliments that of the nanoparticulates, or have a function that is the same as that of the nanoparticulates. As yet another example, the polymer may be selected for its surface modifying properties to beneficially surface modify the nanoparticulates in a way that is useful in some subsequent processing or use of the nanoparticulates.

The invention is not limited to use of any particular polymers in the matrix. Some non-limiting examples of polymers that may be used in the matrix include: fluorinated polymers, thermal curable polymers, UV curable polymers, appended polymers, light emitting polymers, semiconducting polymers, electrically conductive polymers (e.g. polythiophenes, poly (ethylene dioxy thiophene), hydrophobic polymers (siloxanes, polyacrylonitrile, polymethylmethacrylate, polyethyleneterephthalate), hydrophilic polymers (polythiophenes, sulfonated polymers, polymers with ionic functional groups), polyaniline and modified versions, poly pyrroles and modified versions, poly pyidines and modified versions, polycarbonates, polyesters, polyvinylpyrrolidone, polyethylene, epoxies, polytetrafluoroethylene, Kevlar® and Teflon®. The polymers included in the matrix may have any structure; some non-limiting examples of polymeric structures include: dendrimers, long single chain polymers, co-polymers (random or block, e.g. A-B, A-B-A, A-B-C, etc.) branched polymers and grafted polymers.

A reducing agent may also be included in the precursor medium or a reducing agent could instead be included in the gas phase of the gas dispersion, such as for example using a nitrogen gas phase or other oxygen-free gas composition with addition of some hydrogen gas as a reducing agent. In other situations, the reduced form of the material could be formed even at the desired lower temperature using a non-oxidizing gas phase in the gas dispersion, such as pure nitrogen gas or some other oxygen-free gas composition. However, by including a reducing agent in the precursor medium, the use of a non-oxidizing gas phase or a reducing agent in the gas phase may often be avoided, and air may instead be used as the gas phase. This is desirable because it is usually much easier and less expensive to generate and process the gas dispersion using air. The reducing agent is typically a material that either reacts to bind oxygen, or that produces decomposition products that bind with oxygen. The bound oxygen often exits in the gas phase in the form of one or more components such as water vapor, carbon dioxide, carbon monoxide, nitrogen oxides and sulfur oxides. Reducing agents included in the precursor medium are often carbon-containing materials, with carbon from the reducing agents reacting with oxygen to form carbon dioxide and/or carbon monoxide. The reducing agent may also contain hydrogen that reacts with oxygen to form water.

The relative quantities of precursors, liquid vehicle and reagents in the precursor medium will vary, such as for example depending upon the desired composition and morphology of the particles to be produced during particle formation and the particular feed materials used to prepare the gas dispersion. In most situations, however, the liquid vehicle will be present in the precursor medium in the largest proportion, with the precursor medium typically comprising at least 50 weight percent of the liquid vehicle and often at least 70 weight percent of the precursor medium. The precursor medium comprises at least one precursor to a material for inclusion in the particles made during the forming particles, such as material that forms all or part of the nanoparticulates or a material that forms all or part of the matrix. As generated during the generating gas dispersion, the gas phase of the gas dispersion may also comprise one or more than one precursor.

The amount of precursors included in the precursor medium will be selected to provide the desired amount of the final materials in the particles. For example, if the multi-phase particles resulting from particle formation are to contain certain percentages respectively of a nanoparticulate material and a matrix material, then the relative quantities of nanoparticulate precursor and matrix precursor must be properly proportioned in the precursor medium to provide the proper weight fractions, taking into account any reactions that are involved in converting the nanoparticulate and matrix precursors into the respective nanoparticulate and matrix materials in the resulting multi-phase particles. In that regard, the particles made during particle formation will often comprise from 1 weight percent to 80 weight percent nanoparticulates and from 99 weight percent to 20 weight percent matrix.

The gas dispersion is in the nature of a mist: or aerosol of droplets in the gas phase and can be prepared using any technique for finely dividing liquids to produce droplets. Apparatus for generating such droplets are referred to by a variety of names, including liquid atomizers, mist generators, nebulizers and aerosol generators. The technique and apparatus used to generate the gas dispersion may vary depending upon the application.

One example of an apparatus for generating the droplets and mixing the droplets with the carrier gas to form the gas dispersion is an ultrasonic aerosol generator, in which ultrasonic energy is used to form or assist formation of the droplets. One type of ultrasonic aerosol generator is a nozzle-type apparatus, with the nozzle ultrasonically energizable to aid formation of droplets of a fine size and narrow size distribution. Another example of an ultrasonic aerosol generator ultrasonically energizes a reservoir of precursor medium, causing atomization cones to develop, from which droplets of the precursor medium form, and the droplets are swept away by a flowing camer gas. The reservoir-type ultrasonic aerosol generators can produce very small droplets of a relatively narrow size distribution and are preferred for use in applications when the particles made during the forming particles 104 are desired to be in a range of from about 0.2 to about 5 microns (weight average particle size), and especially when a narrow size distribution of the particles is desired. An example of a reservoir-type ultrasonic aerosol generator is described, for example, in U.S. Pat. No. 6,338,809, the entire contents of which are incorporated by reference herein as if set forth herein in full. Although both the nozzle-type ultrasonic aerosol generator and the reservoir-type ultrasonic aerosol generator produce small droplets of a relatively narrow size distribution, the reservoir-type generally produces finer droplets of a more uniform size.

Another example of an apparatus for generating droplets is a spray nozzle (not ultrasonically energized). Several different types of spray nozzles exist for producing droplets in gas dispersions, and new spray nozzles continue to be developed. Some examples of spray nozzles include 2-fluid nozzles, gas nozzles and liquid nozzles. Spray nozzle generators have an advantage of very high throughput compared to ultrasonic generators. Droplets produced using spray nozzles, however, tend to be much larger and to have a much wider size distribution than droplets produced by ultrasonic generators. Therefore, spray nozzles are preferred for making relatively large particles. Other types of droplet generators that may be used include rotary atomizers, and droplet generators that use expansion of a supercritical fluid or high pressure dissolved gas to provide the energy for droplet formation.

Still another method for generating droplets is disclosed in U.S. Pat. No. 6,601,776, the entire contents of which are incorporated herein by reference in as if set forth herein in full. It will be appreciated that no matter what type of droplet generator is used, the size of the particles produced during the forming particles will depend not only upon the size of the droplets produced by the generator, but also on the composition of the precursor medium (such as the concentration and types of precursor(s) in the precursor medium).

As initially generated, the gas dispersion will have a gas phase that is wholly or primarily composed of the carrier gas used to generate the gas dispersion. The gas phase may have some minor components provided by the precursor medium, such as some liquid vehicle vapor from vaporization of some liquid vehicle during generation of the gas dispersion. The carrier gas may be any convenient gas composition and may be, for example, a single component gas composition (such as for example pure nitrogen gas) or a mixture of multiple gas components (such as for example air, or a mixture of nitrogen and hydrogen). As the gas dispersion is processed, however, the composition of the gas phase will change. For example, during particle formation, liquid vehicle is removed from the droplets to the gas phase, typically by evaporation caused by heating. Also, if the precursor medium contains reactive precursors or reagents, as the precursors or reagents react, the composition of the gas phase will contain decomposition products and reaction byproducts. At the conclusion of the forming particles, the gas dispersion will typically comprise an altered gas phase composition and a dispersion of the particles made during the forming particles.

In some implementations, the carrier gas used to generate the gas dispersion will be substantially non-reactive during the processing. For example, the gas phase may contain only one or more inert gases, such as nitrogen and/or argon, depending upon the situation. Air can be used as a non-reactive carrier gas, when the oxygen component of the air is not reactive during processing. In other cases the carrier gas will include one or more reactive components that react during processing, and often during particle formation.

Other processing of the precursors that may occur during particle formation may include for example, precipitating dissolved precursor(s) from the liquid vehicle and fusing particulate precursor(s). Removing liquid from the droplets and reaction of precursor(s) may occur in the same or different equipment. The removing liquid is typically accomplished by vaporizing liquid vehicle. Vaporization of the liquid vehicle is preferably accomplished by heating the gas dispersion to a temperature at which most, and preferably substantially all, of the liquid vehicle in the droplets vaporizes.

Reactions or other processing of precursors to form the desired particles are accomplished in a reactor or reactors. By a reactor, it is meant apparatus in which a chemical reaction or structural change to a material is effected. The removing of the liquid vehicle from the droplets may occur in the reactor or may occur in separate process equipment upstream of the reactor. During particle formation, at least a portion and preferably substantially all, of the liquid vehicle is removed from the droplets to the gas phase of the gas dispersion. Also during particle formation, the matrix/nanoparticulate structure of the multi-phase particles is formed, with a dispersion of nanoparticulates being maintained by the matrix. Removing at least a portion of the liquid vehicle from the droplets during particle formation occurs in the gas dispersion, and often the nanoparticulate/matrix structure is also formed in the gas dispersion, so that the multi-phase particles that result from the forming particles are formed in a dispersed state in the gas dispersion.

The removing of the liquid vehicle from the droplets and the formation of the nanoparticulate/matrix structure of the multi phase particles may occur in the gas dispersion in a single apparatus or processing stage (e.g., both may occur while the gas dispersion passes through a thermal reactor). Alternatively, removing at least a portion of the liquid vehicle may be performed in a separate apparatus or step from the termination of the nanoparticulate/matrix structure (e.g., gas dispersion first dried in a dryer to form precursor particles without the nanoparticulate/matrix structure, followed by processing of the gas dispersion through a separate thermal reactor in which the nanoparticulate/matrix structure is formed). In yet another alternative, at least part of the liquid vehicle is removed from the droplets in the gas dispersion to form such precursor particles, the precursor particles are then separated from the gas dispersion, and the separated precursor particles are then processed to form the nanoparticulate/matrix structure (e.g., by controlled thermal treatment such as in a belt furnace, rotary furnace or tray furnace, with or without the introduction into the furnace of additional reactant(s) or control of the furnace atmosphere).

In one embodiment of the present invention, removing at least a portion of the liquid vehicle (and perhaps substantially all of the liquid vehicle) from the droplets of precursor medium in the gas dispersion and reacting precursors to form the desired materials for inclusion in the multi-phase particles are performed in separate steps. The removing of the liquid vehicle from the droplets may be performed in a reactor, furnace or using spray drying equipment, to produce a precursor particulate product that is collected for further processing. In some cases, the precursor particulate product made by removing the liquid vehicle from the droplets may not have distinct matrix and nanoparticulate phases, but may contain a single phase of mixed precursor(s) that have not yet reacted to form the matrix and nanoparticulate materials. However, in other cases the precursor(s) to the matrix and the precursor(s) to the nanoparticulates may already be in separate phases. The precursor particulate product made by removing the liquid vehicle from the droplets may then be subjected to a heat treatment in a separate reactor or furnace (e.g. belt furnace, tray furnace or rotary furnace) to react the precursors to form the desired matrix and nanoparticulate materials and to impart the nanoparticulate/matrix structure. It should be noted that in some cases during the heat treatment the matrix material of several particles may fuse together to form a continuous structure of matrix material with dispersed nanoparticulates and no longer be in the form of individual multi-phase particles. If it is desirable to have discrete multi-phase particles, the continuous structure of matrix with dispersed nanoparticulates may be jet milled or hammer milled to form separate multi-phase particles.

One example of a reactor for possible use during the forming particles 104 is a flame reactor. Flame reactors utilize a flame from combustion of a fuel to generate the required heat. In some cases, the precursor medium may contain the primary fuel that is combusted to generate the required heat or may contain a supplemental fuel or may contain no fuel for the flame. Flame reactors have an advantage of being able to reach high temperatures. They also have the advantages of being relatively inexpensive and requiring relatively uncomplicated peripheral systems. One problem with flame reactors, however, is that there may be undesirable contamination of particles with byproducts from combustion of the fuel generating the flame. Additionally, there is very little ability to vary and control the environment within the reactor to control the progression of particle formation.

Another example of a reactor for possible use during particle formation is a plasma reactor. In a plasma reactor, the gas dispersion is passed through an ionized plasma zone, which provides the energy for effecting reactions and/or other modifications in the gas dispersion. Another example of a reactor for possible use during the forming particles is a laser reactor. In a laser reactor, the gas dispersion is passed through a laser beam (e.g., a $CO_2$ laser), which provides the energy for effecting reactions and/other modifications in the gas dispersion. Plasma reactors and laser reactors have an advantage of being able to reach very high temperatures, but both require relatively complicated peripheral systems and provide little ability for control of conditions within the reactor during particle formation.

Another example of a reactor for possible use during the forming particles is a hot-wall furnace reactor. In a hot-wall furnace reactor, heating elements heat zones of the inside wall of the reactor to provide the necessary energy to the gas dispersion as it flows through the reactor. Hot-wall furnace reactors have relatively long residence times relative to flame, plasma and laser reactors. Also, by varying the temperature and location of heat input from heating elements in the different heating zones in the reactor, there is significant ability to control and vary the environment within the reactor during particle formation. A spray drier is another example of a reactor that may be used during the forming particles. Spray driers have the advantage of having high throughput, allowing large amounts of particles to be produced. However, because of their larger size they provide less of an ability to control the reactor conditions during particle formation.

The final particles produced during and resulting from the forming particles step are multi-phase particles, meaning that at least two distinct material phases are present in the particles. Moreover, the multi-phase particles comprise the nanoparticulates that include at least a first material phase and the multi-phase particles also comprise the matrix that includes at least a second material phase that is different than the first material phase.

Post Treatment

Although the phosphor powders produced by the foregoing methods may have good crystallinity, it may be desirable to increase the crystallinity (average crystallite size) after production. Thus, the powders can be annealed (heated) for an amount of time and in a preselected environment to increase the crystallinity of the phosphor particles. Increased crystallinity can advantageously yield an increased brightness and efficiency of the phosphor particles. If such annealing steps are performed, the annealing temperature and time should be selected to minimize the amount of interparticle sintering that is often associated with annealing. According to one embodiment, the phosphor powder is preferably annealed at a temperature of from about 600° C. to about 1600° C., more preferably from about 1200° C. to about 1500° C. The annealing can be effected by a variety of methods, including heating in a crucible, in a fluidized bed reactor, agitating while heating, and the like. The annealing time is preferably not more than about 20 hours, preferably about 2 hours and can be as little as about 1 minute. The oxygen-containing powders are typically annealed in an inert gas, such as argon reactive gas, such as hydrogen, or in an oxygen-containing gas, such as air.

Flowable Media

The luminescent compositions described herein can advantageously be used to form flowable media, such as inks, pastes and slurries, for applying a luminescent coating to a substrate. In addition to the luminescent composition, such flowable media may comprise one or more of the following: a liquid vehicle, an anti-agglomeration agent, one or more additives (such as, but not limited to surfactants, polymers, biocides, thickeners, etc.), other particulates (metallic and/or non-metallic), and other components.

Liquid Vehicles

The liquid vehicle imparts flowability to the ink, optionally in combination with one or more other compositions. If the ink comprises articles, either of the luminescent composition or other particulates in the ink, the vehicle preferably comprises a liquid that is capable of stably dispersing the particles, which optionally carry an anti-agglomeration substance thereon, e.g., are capable of affording a dispersion that can be kept at room temperature for several days or even one, two, three weeks or months or even longer without substantial agglomeration and/or settling of the nanoparticles. To this end, it is preferred for the vehicle and/or individual components thereof to be compatible with the surface of the nanoparticles, e.g., to be capable of interacting (e.g., electronically and/or sterically and/or by hydrogen bonding and/or dipole-dipole interaction, etc.) with the surface of the nanoparticles and in particular, with the anti-agglomeration substance.

It is particularly preferred for the vehicle to be capable of dissolving the optional anti-agglomeration substance to at least some extent, for example, in an amount (at 20° C.) of at least about 5 g of anti-agglomeration substance per liter of vehicle, particularly in an amount of at least about 10 g of anti-agglomeration substance, e.g., at least about 15 g, or at least about 20 g per liter of vehicle, preferably in an amount of at least about 100 g, or at least about 200 g per liter of vehicle. In this regard, it is to be appreciated that these preferred solubility values are merely a measure of the compatibility between the vehicle and the anti-agglomeration substance. They are not to be construed as indication that, in the inks, the vehicle is intended to actually dissolve the anti-agglomeration substance and remove it from the surface of the nanoparticles. On the contrary, the vehicle will usually not remove the anti-agglomeration substance from the surface of the nanoparticles to more than a minor extent, if at all.

In view of the preferred interaction between the vehicle and/or individual components thereof and the anti-agglomeration substance on the surface of the nanoparticles, the most advantageous vehicle and/or component thereof for the ink(s) is largely a function of the nature of the anti-agglomeration substance. For example, an anti-agglomeration substance which comprises one or more polar groups such as, e.g., a polymer like polyvinylpyrrolidone will advantageously be combined with a vehicle which comprises (or predominantly consists of) one or more polar components (solvents) such as, e.g., a protic solvent, whereas an anti-agglomeration substance which substantially lacks polar groups will preferably be combined with a vehicle which comprises, at least predominantly, aprotic, non-polar components.

Particularly if the ink(s) are intended for use in direct-write applications such as, e.g., ink-jet printing, the vehicle is preferably selected to also satisfy the requirements imposed by the direct-write method and tool such as, e.g., an ink-jet head, particularly in terms of viscosity and surface tension of the ink(s). These requirements are discussed in more detail further below. Another consideration in this regard is the compatibility of the nanoparticle composition with the substrate in terms of, e.g., wetting behavior (contact angle with the substrate).

In a preferred aspect, the vehicle in the ink(s) may comprise a mixture of at least two solvents, preferably at least two organic solvents, e.g., a mixture of at least three organic solvents, or at least four organic solvents. The use of more than one solvent is preferred because it allows, inter alia, to adjust various properties of a composition simultaneously (e.g., viscosity, surface tension, contact angle with intended substrate etc.) and to bring all of these properties as close to the optimum values as possible.

The solvents comprised in the vehicle may be polar or non-polar or a mixture of both, mainly depending on the nature of the anti-agglomeration substance. The solvents should preferably be miscible with each other to a significant extent. Non-limiting examples of solvents that are useful for the purposes of the present invention include alcohols, polyols, amines, amides, esters, acids, ketones, ethers, water, saturated hydrocarbons, and unsaturated hydrocarbons.

Particularly in the case of an anti-agglomeration substance, which comprises one or more heteroatoms available for hydrogen bonding, ionic interactions, etc. (such as, e.g., O and N), it is advantageous for the vehicle in the ink(s) to comprise one or more polar solvents and, in particular, protic solvents. For example, the vehicle may comprise a mixture of at least two protic solvents or at least three protic solvents. Non-limiting examples of such protic solvents include water, alcohols (e.g., aliphatic and cycloaliphatic alcohols having from 1 to about 12 carbon atoms such as, e.g., methanol, ethanol, n-propanol, isopropanol, 1-butanol, 2-butanol, sek.-butanol, tert.-butanol, the pentanols, the hexanols, the octanols, the decanols, the dodecanols, cyclopentanol, cyclohexanol, and the like), polyols (e.g., alkanepolyols having from 2 to about 12 carbon atoms and from 2 to about 4 hydroxy groups such as, e.g., ethylene glycol, propylene glycol, butylene glycol, 1,3-propanediol, 1,3-butanediol, 1,4-butanediol, 2-methyl-2,4-pentanediol, glycerol, trimethylolpropane, pentaerythritol, and the like), polyalkylene glycols (e.g., polyalkylene glycols comprising from about 2 to about 5 $C_{2-4}$ alkylene glycol units such as, e.g., diethylene glycol, triethylene glycol, tetraethylene glycol, dipropylene gycol, tripropylene glycol and the like) and partial ethers and esters of polyols and polyalkylene glycols (e.g., mono($C_{1-6}$ alkyl) ethers and monoesters of the polyols and polyalkylene glycols with $C_{1-6}$ alkanecarboxylic acids, such as, e.g., ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether and diethylene glycol monobutyl ether (DEGBE), ethylene gycol monoacetate, diethylene glycol monoacetate, and the like). Additionally or alternatively, the vehicle comprises one or more hydrocarbons.

In one aspect, the liquid vehicle in the ink(s) comprises at least two solvents, e.g., at least three solvents, which solvents are preferably selected from $C_{2-4}$ alkanols, $C_{2-4}$ alkanediols and glycerol. For example, the vehicle may comprise ethanol, ethylene glycol and glycerol such as, e.g., from about 35 percent to about 45 percent by weight of ethylene glycol, from about 30 percent to about 40 percent by weight of ethanol and from about 20 percent to about 30 percent by weight of glycerol, based on the total weight of the vehicle. In a preferred aspect, the vehicle comprises about 40 percent by weight of ethylene glycol, about 35 percent by weight of ethanol and about 25 percent by weight of glycerol.

In another aspect, the liquid vehicle comprises a $C_{1-4}$ monoalkyl ether of a $C_{2-4}$ alkanediol and/or of a polyalkylene glycol.

In yet another aspect, the vehicle comprises not more than about 5 weight percent of water, e.g., not more than about 2 weight percent, or not more than about 1 weight percent of water, based on the total weight of the vehicle. For example, the vehicle may be substantially anhydrous.

Further non-limiting examples of organic solvents that may advantageously be used as the vehicle or a component thereof, respectively, include N,N-dimethylformamide, N,N-dimethylacetamide, ethanolamine, diethanolamine, triethanolamine, trihydroxymethylaminomethane, 2-(isopropylamino)-ethanol, 2-pyrrolidone, N-methylpyrrolidone, acetonitrile, the terpineols, ethylene diamine, benzyl alcohol, isodecanol, nitrobenzene and nitrotoluene.

As discussed in more detail below, when selecting a solvent combination for the liquid vehicle, it is desirable to also take into account the requirements, if any, imposed by the deposition tool (e.g., in terms of viscosity and surface tension of the ink) and the surface characteristics (e.g., hydrophilic or hydrophobic) of the intended substrate. In preferred inks, particularly those intended for ink-jet printing with a piezo head, the preferred viscosity thereof (measured at 20° C.) is not lower than about 5 cP, e.g., not lower than about 8 cP, or not lower than about 10 cP, and not higher than about 30 cP, e.g., not higher than about 20 cP, or not higher than about 15 cP. Preferably, the viscosity shows only small temperature dependence in the range of from about 20° C. to about 40° C., e.g., a temperature dependence of not more than about 0.4 cP/° C. It has surprisingly been found that in the case of preferred use in the present invention the presence of metallic nanoparticles in the liquid vehicle does not significantly change the viscosity of the vehicle, at least at relatively low loadings such as, e.g., up to about 20 weight percent. This may in part be due to the usually large difference in density between the vehicle and the nanoparticles which manifests itself in a much lower number of particles than the number of particles that the mere weight percentage thereof would suggest.

Further, the above preferred inks exhibit preferred surface tensions (measured at 20° C.) of not lower than about 20 dynes/cm, e.g., not lower than about 25 dynes/cm, or not lower than about 30 dynes/cm, and not higher than about 40 dynes/cm, e.g., not higher than about 35 dynes/cm. In one aspect, the ink has a surface tension ranging from about 25 dynes/cm to about 55 dynes/cm.

Anti-Agglomeration Agents

As indicated above, the ink optionally comprises nanoparticulates. Due to their small size and the high surface energy associated therewith, nanoparticles usually show a strong tendency to agglomerate and form larger secondary particles (agglomerates). In one aspect of the invention, the nanoparticles comprise an anti-agglomerating agent, which inhibits agglomeration of the nanoparticles. Preferably, the nanoparticles are coated, at least in part, with the anti-agglomerating agent. The anti-agglomerating agent preferably comprises a polymer, preferably an organic polymer.

In several preferred embodiments, the polymer comprises a polymer of vinylpyrrolidone. More preferably, the polymer of vinylpyrrolidone comprises a homopolymer. In other aspects, the polymer of vinylpyrrolidone comprises a copolymer. The copolymer may be selected from the group consisting of a copolymer of vinylpyrrolidone and vinylacetate; a copolymer of vinylpyrrolidone and vinylimidazole; and a copolymer of vinylpyrrolidone and vinylcaprolactam.

The anti-agglomeration substance shields (e.g., sterically and/or through charge effects) the nanoparticles from each other to at least some extent and thereby substantially prevents a direct contact between individual nanoparticles. The anti-agglomeration substance is preferably adsorbed on the surface of the metallic nanoparticles. The term "adsorbed" as used herein includes any kind of interaction between the anti-agglomeration substance and a nanoparticle surface (e.g., the metal atoms on the surface of a nanoparticle) that manifests itself in at least (and preferably) a weak bond between the anti-agglomeration substance and the surface of a nanoparticle. Preferably, the bond is a non-covalent bond, but still strong enough for the nanoparticle/anti-agglomeration substance combination to withstand a washing operation with a solvent that is capable of dissolving the anti-agglomeration substance. In other words, merely washing the metallic nanoparticles with the solvent at room temperature will preferably not remove more than a minor amount (e.g., less than about 10 percent less than about 5 percent or less than about 1 percent) of the anti-agglomeration substance that is in intimate contact with (and (weakly) bonded to) the nanoparticle surface. Of course, any anti-agglomeration substance that is not in intimate contact with a nanoparticle surface but merely accompanies the bulk of the nanoparticles (e.g., as an impurity/contaminant), i.e., without any significant interaction therewith, will preferably be removable from the nanoparticles by washing the latter with a solvent for the anti-agglomeration substance.

The anti-agglomeration substance does not have to be present as a continuous coating (shell) on the entire surface of a metallic nanoparticle. Rather, in order to prevent a substantial agglomeration of the nanoparticles, it will often be sufficient for the anti-agglomeration substance to be present on only a part of the surface of a metallic nanoparticle.

While the anti-agglomeration substance will usually be a single substance or at least comprise two or more substances of the same type, the present invention also contemplates the use of two or more different types of anti-agglomeration substances. For example, a mixture of two or more different low molecular weight compounds or a mixture of two or more different polymers may be used, as well as a mixture of one or more low molecular weight compounds and one or more polymers. The term "anti-agglomeration substance" as used herein includes all of these possibilities.

The weight ratio of metals (or alloys) in the metallic nanoparticles or the particles and anti-agglomeration substance(s) carried thereon can vary over a wide range. The most advantageous ratio depends, inter alia, on factors such as the nature of the anti-agglomeration substance (polymer, low molecular weight substance, etc.) and the size of the metal cores of the nanoparticles or the particles (the smaller the size the higher the total surface area thereof and the higher the amount of anti-agglomeration substance that will desirably be present). Usually, the weight ratio will be not higher than about 100:1, e.g., not higher than about 50:1, or not higher than about 30:1. On the other hand, the weight ratio will usually be not lower than about 5:1, e.g., not lower than about 10:1, not lower than about 15:1, or not lower than about 20:1.

Other Particulates

In addition to the luminescent composition described herein, the ink optionally includes metallic or non-metallic particulate material(s). In one embodiment, the particles comprise microparticles, defined herein as particles having an average particle size (d50 value) of not greater than about 10 microns, not greater than 5 microns, not greater than 2 microns, or not greater than 1 micron. The particles preferably comprise nanoparticles, which have an average particle size of not greater than about 500 nm, preferably not greater than about 100 nm. In terms of ranges, the nanoparticles preferably have an average particle size of from about 10 to 80 nm, e.g., from about 25 to 75 nm, and are not substantially agglomerated.

In one embodiment, the solids loading of particles in the ink is as high as possible without adversely affecting the viscosity or other necessary properties of the composition. For example, the ink can have a particle loading of up to about 75 volume percent. In another embodiment, the ink comprises at least 1 volume percent, or at least about 5 volume percent, or at least about 10 volume percent or at least about 15 volume percent particulates. In terms of ranges, the ink optionally comprises from about 1 to about 60 volume percent particulates, e.g., from about 10 to about 60 volume percent, or from about 30 to about 40 volume percent particulates, based on the total weight of the ink. Preferably, the particle loading does not exceed about 40 volume percent particularly where adequate flow properties must be maintained for the ink.

Some examples of ceramic materials for optional inclusion as the additional particulates include one or more of oxides, sulfides, carbides, nitrides, borides, tellurides, selenides, phosphides, oxycarbides, oxynitrides, titanates, zirconates, stannates, silicates, aluminates, tantalates, tungstates, glasses, doped and mixed metal oxides. For example SiC, and BN are ceramics with high heat transfer coefficients and can be used in heat transfer fluids. Specific examples of some preferred oxides include silica, alumina, titania, magnesia, indium oxide, indium tin oxide and ceria. Moreover, the composition of the particles may be designed for any desired application. For example, alloy particles could include materials for hydrogen storage, such as LaNi, FeTi, $Mg_2Ni$, $ZrV_2$; or materials for magnetic applications, such as, CoFe, $CoFe_2$, FeNi, FePt, FePd, CoPt, CoPd, $SmCO_5$, $Sm_2Co_{17}$, Nd/B/Fe. For example, the particles could be core shell particles, such as, metals coating metals (Ag/Cu, Ag/Ni), metals coating metal oxides ($Ag/Fe_3O_4$), metal oxides coating metals ($SiO_2$/Ag), metal oxides coating metal oxides ($SiO_2/RuO_2$), semiconductors coating semiconductors (Zns/CdSe) or combinations of all these materials.

In one embodiment, the additional particulates comprise glass. The glasses can comprise low melting glasses with softening point below 500° C., below 400° C., or below 300° C. The glasses can comprise borosilicates, lead borosilicates, borosilicates comprising Al, Zn, Ag, Cu, In, Ba, Sr.

The particles can also comprise semiconducting metal oxides such as metal ruthenates. The metal oxide semiconductors can comprise ruthenium oxide, metal ruthenates comprising M-Ru—O with various ratios of M to Ru where M can be Bi, Sr, Pb, Cu, and other materials. The semiconducting materials can comprise metal nitrides.

The particles can also include materials such as a semiconductor, an additional phosphor, an electrical conductor, a transparent electrical conductor, a thermochromic, an electrochromic, a magnetic material, a thermal conductor, an electrical insulator, a thermal insulator, a polishing compound, a catalyst, a pigment, or a drug or other pharmaceutical material.

In another aspect of the invention, the ink comprises elemental carbon particles (micro- or nano-), such as in the form of graphite. Carbon is advantageous due to its very low cost and acceptable conductivity for many applications. In one embodiment, the ink comprises one or more of particulate carbon, carbon black, modified carbon black, carbon nanotubes and/or carbon flakes. The inclusion of carbon in the ink, optionally in combination with metallic particles and/or metallic precursors, is highly desirable for the formation of resistors.

Additionally or alternatively, the ink comprises metallic nanoparticles, e.g., nanoparticles comprising a metallic composition, at least in part. Preferably, the metallic composition comprises a metal selected from the group consisting of silver, gold, copper, nickel, cobalt, palladium, platinum, indium, tin, zinc, titanium, chromium, tantalum, tungsten, iron, rhodium, iridium, ruthenium, osmium and lead. Of course, the ink optionally does not comprise metallic nanoparticles, or comprises less than about 0.1 weight percent metallic nanoparticles, based on the total weight of the ink.

In other embodiments, the metallic composition comprises an alloy. The alloy may comprise a solid mixture, ordered or disordered, of 2, 3, 4 or more metals. In a preferred aspect, the alloy comprises at least two metals, each of the two metals being selected from the group consisting of silver, gold, copper, nickel, cobalt, palladium, platinum, indium, tin, zinc, titanium, chromium, tantalum, tungsten, iron, rhodium, iridium, ruthenium, osmium and lead. For example, the alloy optionally comprises a combination of metals selected from the group consisting of silver/nickel, silver/copper, silver/cobalt, platinum/copper, platinum/ruthenium, platinum/iridium, platinum/gold, palladium/gold, palladium/silver, nickel/copper, nickel/chromium, and titanium/palladium/gold. In another aspect, the alloy comprises at least three metals.

If present, the metallic nanoparticles preferably comprise a metallic composition that exhibits a low bulk resistivity such as, e.g., a bulk resistivity of less than about 15 micro-Ωcm, e.g., less than about 10 micro-Ωcm, or less than about 5 micro-Ωcm.

Also, the nanoparticles may have a core-shell structure made of two different metals such as, e.g., a core of silver and a shell of nickel (e.g. a silver core having a diameter of about 20 nm surrounded by a thick nickel shell about 15 nm.

Metallic nanoparticles suitable for use in the present invention can be produced by a number of methods. A non-limiting example of such a method, commonly known as the polyol process, is disclosed in U.S. Pat. No. 4,539,041. A modification of this method is described in, e.g., P.-Y. Silvert et al., "Preparation of colloidal silver dispersions by the polyol process" Part 1—Synthesis and characterization, J. Mater. Chem., 1996, 6(4), 573-577; Part 2—Mechanism of particle formation, J. Mater. Chem., 1997, 7(2), 293-299. The entire disclosures of these documents are expressly incorporated by reference herein. Briefly, in the polyol process a metal compound is dissolved in, and reduced by a polyol such as, e.g., a glycol at elevated temperature to afford corresponding metal particles. In the modified polyol process the reduction is carried out in the presence of a dissolved polymer, e.g., polyvinylpyrrolidone.

A particularly preferred modification of the polyol process for producing metallic nanoparticles which carry an anti-agglomeration substance such as polyvinylpyrrolidone thereon is described in co-pending U.S. Provisional Application Ser. No. 60/643,578 entitled "Production of Metal Nanoparticles," and in co-pending U.S. Provisional Application Ser. No. 60/643,629 entitled "Separation of Metal Nanoparticles," both filed on Jan. 14, 2005. The entire disclosures of these co-pending applications are expressly incorporated by reference herein. In a preferred aspect of this modified process, a dissolved metal compound (e.g., a silver compound such as silver nitrate) is combined with and reduced by a polyol (e.g., ethylene glycol, propylene glycol and the like) at an elevated temperature (e.g., at about 120° C.) and in the presence of a heteroatom containing polymer (e.g., polyvinylpyrrolidone) which serves as anti-agglomeration substance.

According to a preferred aspect of the present invention, the metallic nanoparticles exhibit a narrow particle size distribution. A narrow particle size distribution is particularly advantageous for direct-write applications because it results in a reduced clogging of the orifice of a direct-write device by large particles and provides the ability to form features having a fine line width, high resolution and high packing density.

The metallic nanoparticles for use in the present invention preferably also show a high degree of uniformity in shape. Preferably, the metallic nanoparticles are substantially spherical in shape. Spherical particles are particularly advantageous because they are able to disperse more readily in a liquid suspension and impart advantageous flow characteristics to the electronic ink, particularly for deposition using an ink-jet device or similar tool. For a given level of solids loading, a low viscosity electronic ink having spherical particles will have a lower viscosity than a composition having non-spherical particles, such as flakes. Spherical particles are also less abrasive than jagged or plate-like particles, reducing the amount of abrasion and wear on the deposition tool.

In a preferred aspect of the present invention, at least about 90% e.g., at least about 95% or at least about 99% of the metallic nanoparticles comprised in the inks are substantially spherical in shape. In another preferred aspect, the electronic inks are substantially free of particles in the form of flakes.

In yet another preferred aspect, the metallic nanoparticles are substantially free of micron-size particles, i.e., particles having a size of about 1 micron or above. Even more preferably, the metallic nanoparticles may be substantially free of particles having a size (=largest dimension, e.g., diameter in the case of substantially spherical particles) of more than about 500 nm, e.g., of more than about 200 nm, or of more than about 100 nm. In this regard, it is to be understood that whenever the size and/or dimensions of the metallic nanoparticles are referred to herein and in the appended claims, this size and these dimensions refer to the nanoparticles without anti-agglomeration substance thereon, e.g., the metal cores of the nanoparticles. Depending on the type and amount of anti-agglomeration substance, an entire nanoparticle, i.e., a nanoparticle, which has the anti-agglomeration substance thereon, may be significantly larger than the metal core thereof. Also, the term "nanoparticle" as used herein and in the appended claims encompasses particles having a size/largest dimension of the metal cores thereof of up to about 900 nm, preferably of up to about 500 nm, more preferably up to about 200 nm, or up to about 100 nm.

By way of non-limiting example, not more than about 5%, e.g., not more than about 2%, not more than about 1%, or not more than about 0.5% of the metallic nanoparticles may be particles whose largest dimension (and/or diameter) is larger than about 200 nm, e.g., larger than about 150 nm, or larger than about 100 nm. In a particularly preferred aspect, at least about 90%, e.g., at least about 95% of the metallic nanoparticles will have a size of not larger than about 80 nm and/or at least about 80% of the metallic nanoparticles will have a size of from about 20 nm to about 70 nm. For example, at least about 90%, e.g., at least about 95% of the nanoparticles, may have a size of from about 30 nm to about 50 nm.

In another aspect, the metallic nanoparticles may have an average particle size (number average) of at least about 10 nm, e.g., at least about 20 nm, or at least about 30 nm, but preferably not higher than about 80 nm, e.g., not higher than about 70 nm, not higher than about 60 nm, or not higher than about 50 nm. For example, the metallic nanoparticles may have an average particle size in the range of from about 25 nm to about 75 nm.

In yet another aspect of the present invention, at least about 80 volume percent, e.g., at least about 90 volume percent of the metallic nanoparticles may be not larger than about 2 times, e.g., not larger than about 1.5 times the average particle size (volume average).

The nanoparticles that are useful in inks according to the present invention preferably have a high degree of purity. For example, the particles (without anti-agglomeration substance) may include not more than about 1 atomic percent impurities, e.g., not more than about 0.1 atomic percent impurities, preferably not more than about 0.01 atomic percent impurities. Impurities are those materials that are not intended in the final product (e.g., the electronic feature) and that adversely affect the properties of the final product.

In another aspect, the metallic nanoparticles can be coated with an intrinsically conductive polymer (which at the same time may serve as an anti-agglomeration substance), preventing agglomeration in the ink and providing a conductive path after solidification of the composition.

It is preferred for the total loading of metallic nanoparticles in the inks be not higher than about 75% by weight, such as from about 5% by weight to about 60% by weight, based on the total weight of the ink. Loadings in excess of the preferred amounts can lead to undesirably high viscosities and/or undesirable flow characteristics. Of course, the maximum loading, which still affords useful results also depends on the density of the metal. In other words, the higher the density of the metal of the nanoparticles, the higher will be the acceptable and desirable loading in weight percent. In preferred aspects, the nanoparticle loading is at least about 10% by weight, e.g., at least about 15% by weight, at least about 20% by weight, or at least about 40% by weight. Depending on the metal, the loading will often not be higher than about 65% by weight, e.g., not higher than about 60% by weight. These percentages refer to the total weight of the nanoparticles, i.e., including any anti-agglomeration substance carried (e.g., adsorbed) thereon.

Additives

The inks used to form the electronic features of the present invention also may include one or more additives including, but not limited to, rheology modifiers and surfactants. Non-limiting examples of rheology modifiers that are suitable for use in the present invention include SOLTHIX 250 (Avecia Limited), SOLSPERSE 21000 (Avecia Limited), styrene allyl alcohol (SAA), ethyl cellulose, carboxy methylcellulose, nitrocellulose, polyalkylene carbonates, ethyl nitrocellulose, and the like. These additives can reduce spreading of the inks after deposition, as discussed in more detail below.

Inks intended for use in an ink-jet device may desirably include surfactants to maintain the particles in suspension. Co-solvents, also known as humectants, can be used to prevent the electronic ink from crusting and clogging the orifice of the ink-jet head. Biocides can also be added to prevent bacterial growth over time. Non-limiting examples of corresponding ink-jet liquid vehicle compositions are disclosed in, e.g., U.S. Pat. Nos. 5,853,470; 5,679,724; 5,725,647; 4,877,451; 5,837,045 and 5,837,041, the entire disclosures whereof are incorporated by reference herein. The selection of such additives is based upon the desired properties of the composition, as is known to those skilled in the art. As set forth above, care should be taken that the additives of the composition do not have a significant adverse effect on the properties of the final feature and/or can be removed easily.

The ink or inks optionally further include additives such as, e.g., wetting angle modifiers, humectants, crystallization inhibitors and the like. Of particular interest are crystallization inhibitors as they prevent crystallization and the associated increase in surface roughness and film uniformity during curing at elevated temperatures and/or over extended periods of time.

Also, the inks preferably do not comprise added binder, e.g., polymeric binder. In this regard it is to be noted that, in the case of polymeric anti-agglomeration substances such as, e.g., polyvinylpyrrolidone, the anti-agglomeration substance itself may serve as a binder, as explained in more detail below.

Ink Deposition Methods

The inks described above can be deposited onto surfaces using a variety of tools such as, e.g., low viscosity deposition tools. As used herein, a low viscosity deposition tool is a device that deposits a liquid or liquid suspension onto a surface by ejecting the ink through an orifice toward the surface without the tool being in direct contact with the surface. The low viscosity deposition tool is preferably controllable over an x-y grid, referred to herein as a direct-write deposition tool. A preferred direct-write deposition tool according to the present invention is an ink-jet device. Other examples of direct-write deposition tools include aerosol jets and automated syringes, such as the MICROPEN tool, available from Ohmcraft, Inc., of Honeoye Falls, N.Y.

A preferred direct-write deposition tool for the purposes of the present invention is an ink-jet device. Ink-jet devices operate by generating droplets of the composition and directing the droplets toward a surface. The position of the ink-jet head is carefully controlled and can be highly automated so that discrete patterns of the composition can be applied to the surface. Ink-jet printers are capable of printing at a rate of about 1000 drops per jet per second or higher and can print linear features with good resolution at a rate of about 10 cm/sec or more, up to about 1000 cm/sec. Each drop generated by the ink-jet head includes approximately 3 to about 100 picoliters of the composition, which is delivered to the surface. For these and other reasons, ink-jet devices are a highly desirable means for depositing materials onto a surface.

Typically, an ink-jet device includes an ink-jet head with one or more orifices having a diameter of not greater than about 100 μm, such as from about 50 μm to about 75 μm. Droplets are generated and are directed through the orifice toward the surface being printed. Ink-jet printers typically utilize a piezoelectric driven system to generate the droplets, although other variations are also used. Ink-jet devices are described in more detail in, for example, U.S. Pat. Nos. 4,627,875 and 5,329,293, the disclosures whereof are incorporated by reference herein in their entireties.

It is also expedient to simultaneously control the surface tension and the viscosity of the ink to enable the use of industrial ink-jet devices. Preferably the surface tension is from about 10 to about 50 dynes/cm, such as from about 20 to about 40 dynes/cm, while the viscosity is maintained at a value of not greater than about 50 centipoise.

According to one aspect, the solids loading of particles in the ink is preferably as high as possible without adversely affecting the viscosity or other desired properties of the composition. As set forth above, the ink preferably has a particle loading of not higher than about 75 weight percent, e.g., from about 5 to about 50 weight percent.

The inks can also be deposited by aerosol jet deposition. Aerosol jet deposition allows the formation of features including electronic features, having a feature width of, e.g., not greater than about 200 μm, such as not greater than about 150 μm, not greater than about 100 μm and even not greater than about 50 μm. In aerosol jet deposition, the electronic ink is aerosolized into droplets and the droplets are transported to the substrate in a flow gas through a flow channel. Typically, the flow channel is straight and relatively short. Examples of tools and methods for the deposition of fluids using aerosol jet deposition include those disclosed in U.S. Pat. Nos. 6,251,488, 5,725,672 and 4,019,188, the entire disclosures whereof are incorporated by reference herein.

The inks described herein can also be deposited by a variety of other techniques, including intaglio, roll printer, spraying, dip coating, spin coating, and other techniques that direct discrete units of fluid or continuous jets, or continuous sheets of fluid to a surface. Other examples of advantageous printing methods for the present ink compositions include lithographic printing and gravure printing. For example, gravure printing can be used with inks having a viscosity of up to about 5,000 centipoise. The gravure method can deposit features having an average thickness of from about 1 μm to about 25 μm and can deposit such features at a high rate of speed, such as up to about 700 meters per minute. The gravure process also comprises the direct formation of patterns onto the surface.

As discussed above, ink deposition can be carried out, for example, by pen/syringe, continuous or drop on demand ink-jet, droplet deposition, spraying, flexographic printing, lithographic printing, gravure printing, other intaglio printing, and others. The ink can also be deposited by dip-coating or spin-coating, or by pen dispensing onto rod or fiber type substrates. Immediately after deposition, the composition may spread, draw in upon itself, or form patterns depending on the surface modification discussed above. In another aspect, a method is provided for processing the deposited composition using two or more jets or other ink sources. An example of a method for processing the deposited composition is using infiltration into a porous bed formed by a previous fabrication method. Another exemplary method for depositing the composition is using multi-pass deposition to build the thickness of the deposit. Another example of a method for depositing the composition is using a heated head to decrease the viscosity of the composition.

The properties of the deposited ink can also be subsequently modified. This can include freezing, melting and otherwise modifying the properties, such as viscosity with or without chemical reactions or removal of material from the ink. For example, an ink including a UV-curable polymer can be deposited and immediately exposed to an ultraviolet lamp to polymerize and thicken and reduce spreading of the composition. Similarly, a thermoset polymer can be deposited and exposed to a heat lamp or other infrared light source.

After deposition, the ink may be treated to convert the ink to the desired structure and/or material, e.g., a phosphorescent coating. The treatment can include multiple steps, or can occur in a single step, such as when the ink is rapidly heated and held at the processing temperature for a sufficient amount of time to form a phosphorescent coating.

An optional, initial step may include drying or subliming of the composition by heating or irradiating. In this step, material (e.g., solvent) is removed from the composition and/or chemical reactions occur in the composition. Non-limiting examples of methods for processing the deposited composition in this manner include methods using a UV, IR, laser or a conventional light source. Heating rates for drying the ink are preferably greater than about 10° C./min, more preferably greater than about 100° C./min and even more preferably greater than about 1000° C./min. The temperature of the deposited ink can be raised using hot gas or by contact with a heated substrate. This temperature increase may result in further evaporation of vehicle and other species. A laser, such as an IR laser, can also be used for heating. An IR lamp, a hot plate or a belt furnace can also be utilized. It may also be desirable to control the cooling rate of the deposited feature.

The inks can be processed for very short times and still provide useful materials. Short heating times can advantageously prevent damage to the underlying substrate. For example, thermal processing times for deposits having a thickness on the order of about 10 μm may be not greater than about 100 ms, e.g., not greater than about 10 milliseconds (ms), or not greater than about 1 ms. The short heating times can be provided using laser (pulsed or continuous wave), lamps, or other radiation. Particularly preferred are scanning lasers with controlled dwell times. When processing with belt and box furnaces or lamps, the hold time may often be not longer than about 60 seconds, e.g., not longer than about 30 seconds, or not longer than about 10 seconds. The heating time may even be not greater than about 1 second when processed with these heat sources, and even not greater than about 0.1 second while still providing conductive materials that are useful in a variety of applications. The preferred heating time and temperature will also depend on the nature of the desired feature, e.g., of the desired electronic feature. It will be appreciated that short heating times may not be beneficial if the solvent or other constituents boil rapidly and form porosity or other defects in the feature.

By way of non-limiting example, an ink coating may be cured by a number of different methods including thermal, UV and pressure-based curing. The thermal curing can be effected by removing the solvents at low temperatures and creating a reflective print. On some substrates, such as paper, no thermal curing step may be necessary at all, while in others a mild thermal curing step such as short exposure to an IR lamp may be sufficient. In this particular embodiment, the ink has a higher absorption cross-section for the IR energy derived from the lamp than the surrounding substrate and so the printed metallic feature is preferentially thermally cured. In cases where the ink contains a photoactive reagent a printed metallic feature in accordance with the present invention may also be cured by irradiation with UV light. The photoactive reagent may, for example, be a monomer or low molecular weight polymer which polymerizes on exposure to UV light resulting in a robust, insoluble metallic layer. In cases where electric conductivity is important, a photoactive metal species may, for example, be incorporated into the ink to provide good connectivity between the nanoparticles in the ink after curing. In this embodiment, the photoactive metal-containing species is photochemically reduced to form the corresponding metal.

In a further aspect of the present invention, the printed ink may be cured by compression. This can be achieved by exposing the substrate containing the printed feature to any of a variety of different processes that "weld" the nanoparticles in the ink. Non-limiting examples of these processes include stamping and roll pressing. For example, for applications in the security industry, subsequent processing steps in the construction of a secure document are likely to include intaglio printing which will result in the exposure of the substrate containing the printed feature to high pressure and temperatures in the range of from about 50° C. to about 100° C. Of course, any combination of heating, pressing and UV-curing may be used for curing a printed feature in accordance with the present invention.

On some substrates such as paper, no thermal curing step may be necessary, while in others a mild thermal curing step such as, e.g., short exposure to an infra-red lamp may be sufficient. In this particular embodiment, the ink may have a higher absorption cross-section for the IR energy derived from the heat lamp compared to the surrounding substrate and so the applied composition may be preferentially thermally cured.

If present, the particles in the ink may optionally be (fully) sintered. The sintering can be carried out using, for example, furnaces, light sources such as heat lamps and/or lasers. In one aspect, the use of a laser advantageously provides very short sintering times and in one aspect the sintering time is not greater than about 1 second, e.g., not greater than about 0.1 seconds, or even not greater than about 0.01 seconds. Laser types include pulsed and continuous wave lasers. In one aspect, the laser pulse length is tailored to provide a depth of heating that is equal to the thickness of the material to be sintered.

It will be appreciated from the foregoing discussion that two or more of the latter process steps (drying, heating and sintering) can be combined into a single process step. Also, one or more of these steps may optionally be carried out in a reducing atmosphere (e.g., in an $H_2/N_2$ atmosphere for metals that are prone to undergo oxidation, especially at elevated temperature) or in an oxidizing atmosphere.

The deposited and treated material may be post-treated. The post-treatment can, for example, include cleaning and/or encapsulation of the printed feature (e.g., in order to protect the deposited material from oxygen, water or other potentially harmful substances) or other modifications. The same applies to any other metal structures that may be formed (e.g., deposited) with a nanoparticle composition of the present invention.

One exemplary process flow includes the steps of: forming a structure by conventional methods, such as lithographic, gravure, flexo, screen printing, photo patterning, thin film or wet subtractive approaches; identifying locations requiring addition of material; adding material by a direct deposition of a low viscosity composition; and processing to form the final product. In a specific aspect, a circuit may be prepared by, for example, screen-printing and then be repaired by localized printing of a low viscosity electronic ink of the present invention.

In another aspect, features larger than approximately 100 µm are first prepared by screen-printing. Features not greater than about 100 µm are then deposited by a direct deposition method using the ink.

In accordance with the direct-write processes, the present inks can be used in the formation of features for devices and components having a small minimum feature size. For example, the inks can be used to fabricate features having a minimum feature size (the smallest feature dimension in the x-y axis) of not greater than about 200 µm, e.g., not greater than about 150 µm, or not greater than about 100 µm. These feature sizes can be provided using ink-jet printing and other printing approaches that provide droplets or discrete units of composition to a surface. The small feature sizes can advantageously be applied to various components and devices, as is discussed below.

The inks can be used to form dots, squares and other isolated regions of material. The regions can have a minimum feature size of not greater than about 250 µm, such as not greater than about 100 µm, and even not greater than about 50 µm, such as not greater than about 25 µm, or potentially not greater than about 10 µm. These features can be deposited by ink-jet printing of a single droplet or multiple droplets at the same location with or without drying in between deposition of droplets or periods of multiple droplet deposition. In one aspect, the surface tension of the ink on the substrate material may be chosen to provide poor wetting (e.g., poor penetration) of the surface so that the composition contracts onto itself after printing. This provides a method for producing deposits with sizes equal to or smaller than the droplet diameter.

Luminescent coatings produced with the inks described herein will typically have a coating weight is at least 0.0005 $mg/cm^2$.

Uses of the Luminescent Compositions

The luminescent compositions described herein can be incorporated into a number of devices, wherein the devices will have significantly improved performance resulting directly from the characteristics of the phosphor powders of the present invention. The devices can include light-emitting lamps and display devices for visually conveying information and graphics. Such display devices include traditional CRT-based display devices, such as televisions, and also include flat panel displays. Flat panel displays are relatively thin devices that present graphics and images without the use of a traditional picture tube and operate with modest power requirements. Generally, flat panel displays include a phosphor powder selectively dispersed on a viewing panel, wherein the excitation source lies behind and in close proximity to the panel. Flat panel displays include liquid crystal displays (LCD), plasma display panels (PDP's) electroluminescent (EL) displays, and field emission displays (FED'S). Other applications for the use of the phosphor of the invention include biomedical sensors, fiber optics (including amplifiers), taggants for use in security applications, and in lasers.

EXAMPLES

The following phosphors were prepared using a standard set of conditions for the spray pyrolysis of a powder. An aqueous precursor solution was formed comprising an aqueous solution of metal nitrate salts. The total precursor concentration was 8.0 weight percent calculated as the molar ratio of the mass of the oxide product produced to the total mass of the precursor solution. The liquid solution was atomized using ultrasonic transducers at a frequency of 1.6 MHz. Air was used as a carrier gas and the aerosol was carried through a tubular furnace having a temperature of 900° C. The total residence time in the furnace was less than about 4 seconds.

Example 1

$Y_2O_3$: Eu Phosphor

A precursor solution comprising yttrium nitrate and europium nitrate was prepared using a concentration of 5 weight percent (wt %) as calculated above. The molar ratio of yttrium and europium was 0.95:0.05. The solution was atomized and pyrolyzed to prepare a powder. The powder produced was heat treated at a temperature of 1300° C. for 1 hour to produce a phosphor with a small particle size.

Example 2

$Y_2O_3$: Yb, Tm Phosphor

A precursor solution comprising yttrium nitrate, ytterbium nitrate, and thulium nitrate was prepared using a concentration of 5 weight percent as calculated above. The molar ratio of yttrium, ytterbium, and thulium was 0.95:0.0499:0.001. The solution was atomized and pyrolyzed to prepare a powder. The powder produced was heat treated at a temperature of 1300° C. for 1 hour to produce a phosphor with a small particle size.

Example 3

$Y_2O_3$: Yb, Er Phosphor

A precursor solution comprising yttrium nitrate, ytterbium nitrate, and erbium nitrate was prepared using a concentration of 5 weight percent as calculated above. The molar ratio of yttrium, ytterbium, and erbium was 0.98:0.02. The solution was atomized and pyrolyzed to prepare a powder. The powder produced was heat treated at a temperature of 1300° C. for 1 hour to produce a phosphor with a small particle size.

Example 4

$Y_2O_3$: Yb, Er Phosphor

A precursor solution comprising yttrium nitrate, ytterbium nitrate, and erbium nitrate was prepared using a concentration of 5 weight percent as calculated above. The molar ratio of yttrium, ytterbium, and erbium was 0.80:0.20:0. The solution was atomized and pyrolyzed to prepare a powder. The powder produced was heat treated at a temperature of 1300° C. for 1 hour to produce a phosphor with a small particle size.

Example 5

$Y_2O_3$: Yb, Er Phosphor

A precursor solution comprising yttrium nitrate, ytterbium nitrate, and erbium nitrate was prepared using a concentration of 5 weight percent as calculated above. The molar ratio of yttrium, ytterbium, and erbium was 0.95:0.04:0.01. The solution was atomized and pyrolyzed to prepare a powder. The powder produced was heat treated at a temperature of 1300° C. for 1 hour to produce a phosphor with a small particle size.

Example 6

$Y_2O_3$: Yb, Er Phosphor

A precursor solution comprising yttrium nitrate, ytterbium nitrate, and erbium nitrate was prepared using a concentration of 5 weight percent as calculated above. The molar ratio of yttrium, ytterbium, and erbium was 0.985:0.01:0.005. The solution was atomized and pyrolyzed to prepare a powder. The powder produced was heat treated at a temperature of 1300° C. for 1 hour to produce a phosphor with a small particle size.

Example 7

$YBO_3$: Yb Phosphor

A precursor solution comprising yttrium nitrate, ytterbium nitrate, and boric acid was prepared using a concentration of 5 wt % as calculated above. The molar ratio of boron, yttrium, and ytterbium was 1.00:0.80:0.20. The solution was atomized and pyrolyzed to prepare a powder. The powder produced was heat treated at a temperature of 1300° C. for 1 hour to produce a phosphor with a small particle size.

Example 8

$YBO_3$: Yb Phosphor

A precursor solution comprising yttrium nitrate, ytterbium nitrate, and boric acid was prepared using a concentration of 5 wt % as calculated above. The molar ratio of boron, yttrium, and ytterbium was 1.00:0.95:0.05. The solution was atomized and pyrolyzed to prepare a powder. The powder produced was heat treated at a temperature of 1300° C. for 1 hour to produce a phosphor with a small particle size.

Example 9

$Y_{0.76}Gd_{0.24}BO_3$: Eu Phosphor

A precursor solution comprising yttrium nitrate, gadolinium nitrate, europium nitrate, and boric acid was prepared using a concentration of 5 wt % as calculated above. The molar ratio of boron, yttrium, gadolinium and europium was 1.00:0.72:0.23:0.05. The solution was atomized and pyrolyzed to prepare a powder. The powder produced was heat treated at a temperature of 1300° C. for 1 hour to produce a phosphor with a small particle size.

The following additional examples are prepared using a standard set of conditions for the spray pyrolysis of a powder. An aqueous precursor solution is formed comprising an aqueous solution of metal nitrate salts. The total precursor concentration is 8.0 weight percent calculated as the molar ratio of the mass of the oxide product produced to the total mass of the precursor solution. The liquid solution is atomized using an ultrasonic transducers at a frequency of 1.6 MHz. Air is used as a carrier gas and the aerosol is carried through a tubular furnace having a temperature of 800° C. The total residence time in the furnace is less than about 4 seconds.

Example 10

$YPO_4$: Yb, Er Phosphor

A precursor solution comprising yttrium nitrate, ytterbium nitrate, erbium nitrate, and phosphoric acid in a ratio of 1 mole of phosphoric acid per mole of yttrium, ytterbium, and erbium nitrates is prepared using a concentration of 5 wt % as calculated above. The molar ratio of yttrium, ytterbium, and erbium is 0.95:0.04:0.01. The solution is atomized and pyrolyzed to prepare a powder. The powder produced is heat treated at a temperature of 1000° C. for 1 hour to produce a phosphor with a small particle size.

Example 11

$LaPO_4$: Yb, Er Phosphor

A precursor solution comprising lanthanum nitrate, ytterbium nitrate, erbium nitrate, and phosphoric acid in a ratio of 1 mole of phosphoric acid per mole of lanthanum, ytterbium, and erbium nitrates is prepared using a concentration of 5 wt % as calculated above. The molar ratio of lanthanum, ytterbium, and erbium is 0.95:0.04:0.01. The solution is atomized and pyrolyzed to prepare a powder. The powder produced is heat treated at a temperature of 1000° C. for 1 hour to produce a phosphor with a small particle size.

Example 12

$LaPO_4$: Yb Phosphor

A precursor solution comprising lanthanum nitrate, ytterbium nitrate, and phosphoric acid in a ratio of 1 mole of phosphoric acid per mole of lanthanum and ytterbium nitrates is prepared using a concentration of 5 wt % as calculated above. The molar ratio of lanthanum and ytterbium is 0.96:0.04. The solution is atomized and pyrolyzed to prepare a powder. The powder produced is heat treated at a temperature of 1000° C. for 1 hour to produce a phosphor with a small particle size.

Example 13

$LaPO_4$: Nd Phosphor

A precursor solution comprising lanthanum nitrate, neodymium nitrate, and phosphoric acid in a ratio of 1 mole of phosphoric acid per mole of lanthanum and ytterbium nitrates is prepared using a concentration of 5 weight percent as calculated above. The molar ratio of lanthanum and neodymium is 0.96:0.04. The solution is atomized and pyrolyzed to prepare a powder. The powder produced is heat treated at a temperature of 1000° C. for 1 hour to produce a phosphor with a small particle size.

Example 14

$LaPO_4$: Eu Phosphor

A precursor solution comprising lanthanum nitrate, europium nitrate, and phosphoric acid in a ratio of 1 mole of phosphoric acid per mole of lanthanum and ytterbium nitrates is prepared using a concentration of 5 weight percent as calculated above. The molar ratio of lanthanum and europium is 0.96:0.04. The solution is atomized and pyrolyzed to prepare a powder. The powder produced is heat treated at a temperature of 1000° C. for 1 hour to produce a phosphor with a small particle size.

Example 15

$La_2O_3$: Yb, Er Phosphor

A precursor solution comprising lanthanum nitrate, ytterbium nitrate, and erbium nitrate is prepared using a concentration of 5 weight percent as calculated above. The molar ratio of lanthanum, ytterbium, and erbium is 0.95:0.04:0.01. The solution is atomized and pyrolyzed to prepare a powder. The powder produced is heat treated at a temperature of 1300° C. for 2 hours to produce a phosphor with a small particle size.

Example 16

$LaAlO_3$: Yb, Er Phosphor

A precursor solution comprising lanthanum nitrate, ytterbium nitrate, erbium nitrate, and aluminum nitrate is prepared using a concentration of 5 weight percent as calculated above. The molar ratio of aluminum, lanthanum, ytterbium, and erbium is 1.00:0.95:0.04:0.01. The solution is atomized and pyrolyzed to prepare a powder. The powder produced is heat treated at a temperature of 1300° C. for 2 hours to produce a phosphor with a small particle size.

Example 17

$LuAlO_3$: Yb, Er Phosphor

A precursor solution comprising lutetium nitrate, ytterbium nitrate, erbium nitrate, and aluminum nitrate is prepared using a concentration of 5 weight percent as calculated above. The molar ratio of aluminum, lutetium, ytterbium, and erbium is 1.00:0.95:0.04:0.01. The solution is atomized and pyrolyzed to prepare a powder. The powder produced is heat treated at a temperature of 1300° C. for 2 hours to produce a phosphor with a small particle size.

Example 18

$La_3Al_5O_{12}$: Yb, Er Phosphor

A precursor solution comprising lanthanum nitrate, ytterbium nitrate, erbium nitrate, and aluminum nitrate is prepared using a concentration of 5 weight percent as calculated above. The molar ratio of aluminum, lanthanum, ytterbium, and erbium is 5.00:2.85:0.12:0.03. The solution is atomized and pyrolyzed to prepare a powder. The powder produced is heat treated at a temperature of 1300° C. for 2 hours to produce a phosphor with a small particle size.

Example 19

$Lu_3Al_5O_{12}$: Yb, Er Phosphor

A precursor solution comprising lutetium nitrate, ytterbium nitrate, erbium nitrate, and aluminum nitrate is prepared using a concentration of 5 weight percent as calculated above. The molar ratio of aluminum, lutetium, ytterbium, and erbium is 5.00:2.85:0.12:0.03. The solution is atomized and pyrolyzed to prepare a powder. The powder produced is heat treated at a temperature of 1300° C. for 2 hours to produce a phosphor with a small particle size.

Example 20

$Y_3Al_5O_{12}$: Yb, Er Phosphor

A precursor solution comprising yttrium nitrate, ytterbium nitrate, erbium nitrate, and aluminum nitrate is prepared using a concentration of 5 weight percent as calculated above. The molar ratio of aluminum, yttrium, ytterbium, and erbium is 5.00:2.85:0.12:0.03. The solution is atomized and pyrolyzed to prepare a powder. The powder produced is heat treated at a temperature of 1300° C. for 2 hours to produce a phosphor with a small particle size.

Example 21

$Y_3Al_5O_{12}$: Eu Phosphor

A precursor solution comprising yttrium nitrate, europium nitrate, and aluminum nitrate is prepared using a concentration of 5 weight percent as calculated above. The molar ratio of aluminum, yttrium, and europium is 5.00:2.85:0.15. The solution is atomized and pyrolyzed to prepare a powder. The powder produced is heat treated at a temperature of 1300° C. for 2 hours to produce a phosphor with a small particle size.

Example 22

$Y_3Al_5O_{12}$: Nd Phosphor

A precursor solution comprising yttrium nitrate, neodymium nitrate, and aluminum nitrate is prepared using a concentration of 5 weight percent as calculated above. The molar ratio of aluminum, yttrium, and neodymium is 5.00:2.85:0.15. The solution is atomized and pyrolyzed to prepare a powder. The powder produced is heat treated at a temperature of 1300° C. for 2 hours to produce a phosphor with a small particle size.

Example 23

$Y_3Al_4GaO_{12}$: Yb, Er Phosphor

A precursor solution comprising yttrium nitrate, ytterbium nitrate, erbium nitrate, gallium nitrate, and aluminum nitrate is prepared using a concentration of 5 weight percent as calculated above. The molar ratio of aluminum, gallium, yttrium, ytterbium, and erbium is 4.00:1.00:2.85:0.12:0.03. The solution is atomized and pyrolyzed to prepare a powder. The powder produced is heat treated at a temperature of 1300° C. for 2 hours to produce a phosphor with a small particle size.

Example 24

$Y_2GdAl_5O_{12}$: Yb, Er Phosphor

A precursor solution comprising yttrium nitrate, gadolinium nitrate, ytterbium nitrate, erbium nitrate, and aluminum nitrate is prepared using a concentration of 5 weight percent as calculated above. The molar ratio of aluminum, gadolinium, yttrium, ytterbium, and erbium is 5.00:0.95:1.90:0.12:0.03. The solution is atomized and pyrolyzed to prepare a powder. The powder produced is heat treated at a temperature of 1300° C. for 2 hours to produce a phosphor with a small particle size.

Example 25

$YBO_3$: Yb, Er Phosphor

A precursor solution comprising yttrium nitrate, ytterbium nitrate, erbium nitrate, and boric acid is prepared using a concentration of 5 weight percent as calculated above. The molar ratio of boron, yttrium, ytterbium, and erbium is 1.00:0.95:0.04:0.01. The solution is atomized and pyrolyzed to prepare a powder. The powder produced is heat treated at a temperature of 1100° C. for 2 hours to produce a phosphor with a small particle size.

Example 26

$YBO_3$: Eu Phosphor

A precursor solution comprising yttrium nitrate, europium nitrate, and boric acid is prepared using a concentration of 5 weight percent as calculated above. The molar ratio of boron, yttrium, and europium is 1.00:0.95:0.05. The solution is atomized and pyrolyzed to prepare a powder. The powder produced is heat treated at a temperature of 1100° C. for 2 hours to produce a phosphor with a small particle size.

Example 27

$LaBO_3$: Yb, Er Phosphor

A precursor solution comprising lanthanum nitrate, ytterbium nitrate, erbium nitrate, and boric acid is prepared using a concentration of 5 weight percent as calculated above. The molar ratio of boron, lanthanum, ytterbium, and erbium is 1.00:0.95:0.04:0.01. The solution is atomized and pyrolyzed to prepare a powder. The powder produced is heat treated at a temperature of 1100° C. for 2 hours to produce a phosphor with a small particle size.

Example 28

$Y_2SiO_5$: Yb, Er Phosphor

A precursor solution comprising yttrium nitrate, ytterbium nitrate, erbium nitrate, and colloidal silica is prepared using a concentration of 5 weight percent as calculated above. The molar ratio of silicon, yttrium, ytterbium, and erbium is 1.00:1.90:0.08:0.02. The solution is atomized and pyrolyzed to prepare a powder. The powder produced is heat treated at a temperature of 1200° C. for 2 hours to produce a phosphor with a small particle size.

Example 29

$La_2SiO_5$: Yb, Er Phosphor

A precursor solution comprising lanthanum nitrate, ytterbium nitrate, erbium nitrate, and colloidal silica is prepared using a concentration of 5 weight percent as calculated above. The molar ratio of silicon, lanthanum, ytterbium, and erbium is 1.00:1.90:0.08:0.02. The solution is atomized and pyrolyzed to prepare a powder. The powder produced is heat treated at a temperature of 1200° C. for 2 hours to produce a phosphor with a small particle size.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A secure document, comprising:
   a document; and
   a security taggant comprising a powder batch comprising a luminescent composition that, when excited by electromagnetic radiation at a first frequency, emits electromagnetic radiation at a second frequency equal to or within 1500 $cm^{-1}$ of the first frequency, wherein particles of said luminescent composition are substantially spherical.

2. The secure document of claim 1, wherein the luminescent composition comprises particles of at least one host lattice and at least one lanthanide element dopant ion, wherein said at least one host lattice is selected from an yttrium compound, a lutetium compound and a lanthanum compound and said at least one lanthanide element dopant ion is selected from a ytterbium cation, an erbium cation and a thulium cation, having a weight average particle size between about 2 μm and less than about 10 μm.

3. The secure document of claim 1, wherein said luminescent composition, when excited by electromagnetic radiation at said first frequency, emits electromagnetic radiation at a second frequency equal to or within 1000 $cm^{-1}$ of the first frequency.

4. The secure document of claim 1, wherein said luminescent composition, when excited by electromagnetic radiation at said first frequency, emits electromagnetic radiation at a second frequency equal to or within 500 $cm^{-1}$ of the first frequency.

5. The secure document of claim 2, wherein said luminescent composition comprises particles having a weight average particle size of between about 2 μm and less than about 5 μm.

6. The secure document of claim 2, wherein said luminescent composition comprises particles having a weight average particle size of between about 2 μm and less than about 3 μm.

7. The secure document of claim 1, wherein said luminescent composition comprises particles having a particle size distribution such that at least about 90 weight percent of said particles are not larger than twice an average particle size.

8. The secure document of claim 2, wherein said at least one host lattice is selected from yttria, yttrium borate, yttrium phosphate, yttrium aluminate, yttrium silicate, and a mixed oxide of yttrium, gadolinium and aluminum.

9. The secure document of claim 2, wherein said at least one host lattice is selected from lanthanum oxide, lanthanum phosphate, lanthanum aluminate, lanthanum borate and lanthanum silicate.

10. The secure document of claim 2, wherein said at least one host lattice is selected from lutetium oxide and lutetium aluminate.

11. The secure document of claim 2, wherein the particles further comprise a microstructure containing crystallites of said luminescent composition of a size between about 25 nm and less than 150 nm, with less than 30 wt% of the mass of said crystallites being of a size between 150 nm and 600 nm.

12. The secure document of claim 11, wherein the crystallites are of a size between about 40 nm and less than 150 nm.

13. The secure document of claim 11, wherein the crystallites are of a size between about 60 nm and less than 150 nm.

14. The secure document of claim 11, wherein the crystallites are of a size between about 80 nm and less than 150 nm.

15. The secure document of claim 11, wherein the crystallites are of a size between about 100 nm and less than 150 nm.

16. A luminescent ink, comprising:
    (a) a liquid vehicle phase; and
    (b) a functional phase dispersed throughout the liquid phase, the functional phase comprising a powder batch comprising a luminescent composition that, when excited by electromagnetic radiation at a first frequency, emits electromagnetic radiation at a second frequency equal to or within 1500 $cm^{-1}$ of the first frequency, wherein particles of said luminescent composition are substantially spherical.

17. The luminescent ink of claim 16, wherein the luminescent composition comprises particles of at least one host lattice and at least one lanthanide element dopant ion, wherein said at least one host lattice is selected from an yttrium compound, a lutetium compound and a lanthanum compound and said at least one lanthanide element dopant ion is selected from a ytterbium cation, an erbium cation and a thulium cation, having a weight average particle size between about 2 μm and less than about 10 μm.

18. The luminescent ink of claim 16, wherein said luminescent composition, when excited by electromagnetic radiation at said first frequency, emits electromagnetic radiation at a second frequency equal to or within 1000 $cm^{-1}$ of the first frequency.

19. The luminescent ink of claim 16, wherein said luminescent composition, when excited by electromagnetic radiation at said first frequency, emits electromagnetic radiation at a second frequency equal to or within 500 $cm^{-1}$ of the first frequency.

20. The luminescent ink of claim 17, wherein said luminescent composition comprises particles having a weight average particle size of between about 2 μm and less than about 5 μm.

21. The luminescent ink of claim 17, wherein said luminescent composition comprises particles having a weight average particle size of between about 2 μm and less than about 3 μm.

22. The luminescent ink of claim 16, wherein said luminescent composition comprises particles having a particle size distribution such that at least about 90 weight percent of said particles are not larger than twice an average particle size.

23. The luminescent ink of claim 17, wherein said at least one host lattice is selected from yttria, yttrium borate, yttrium phosphate, yttrium aluminate, yttrium silicate, and a mixed oxide of yttrium, gadolinium and aluminum.

24. The luminescent ink of claim 17, wherein said at least one host lattice is selected from lanthanum oxide, lanthanum phosphate, lanthanum aluminate, lanthanum borate and lanthanum silicate.

25. The luminescent ink of claim 17, wherein said at least one host lattice is selected from lutetium oxide and lutetium aluminate.

26. The luminescent ink of claim 17, wherein the particles further comprise a microstructure containing crystallites of said luminescent composition of a size between about 25 nm and less than 150 nm, with less than 30 wt% of the mass of said crystallites being of a size between 150 nm and 600 nm.

27. The luminescent ink of claim 26, wherein the crystallites are of a size between about 40 nm and less than 150 nm.

28. The luminescent ink of claim 26, wherein the crystallites are of a size between about 60 nm and less than 150 nm.

29. The luminescent ink of claim 26, wherein the crystallites are of a size between about 80 nm and less than 150 nm.

30. The luminescent ink of claim 26, wherein the crystallites are of a size between about 100 nm and less than 150 nm.

* * * * *